US012276943B2

(12) United States Patent
Ely et al.

(10) Patent No.: US 12,276,943 B2
(45) **Date of Patent: *Apr. 15, 2025**

(54) CONDUCTIVE CAP FOR WATCH CROWN

(71) Applicant: Apple Inc., Cupertino, CA (US)

(72) Inventors: Colin M. Ely, Sunnyvale, CA (US); Sameer Pandya, Sunnyvale, CA (US); Steven C. Roach, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,608

(22) Filed: Oct. 23, 2023

(65) Prior Publication Data

US 2024/0053707 A1 Feb. 15, 2024

Related U.S. Application Data

(63) Continuation of application No. 17/507,381, filed on Oct. 21, 2021, now Pat. No. 11,796,961, which is a (Continued)

(51) Int. Cl.
*G04B 3/04* (2006.01)
*G04C 3/00* (2006.01)
(Continued)

(52) U.S. Cl.
CPC ............. *G04B 3/046* (2013.01); *G04C 3/001* (2013.01); *G04G 17/045* (2013.01); *G04G 17/06* (2013.01);
(Continued)

(58) Field of Classification Search
CPC .... G04G 21/025; G04G 17/045; G04G 17/06; G04G 21/08; G04G 17/08; G04B 3/046;
(Continued)

(56) References Cited

U.S. PATENT DOCUMENTS

| | | | |
|---|---|---|---|
| 2,237,860 | A | 4/1941 | Bolle |
| 2,288,215 | A | 6/1942 | Taubert et al. |

(Continued)

FOREIGN PATENT DOCUMENTS

| | | |
|---|---|---|
| CH | 1888928 | 1/1937 |
| CN | 1302740 | 9/2001 |

(Continued)

OTHER PUBLICATIONS

Author Unknown, "Desirable Android Wear smartwatch from LG," Gulf News, Dubai, 3 pages, Jan. 30, 2015.

(Continued)

*Primary Examiner* — Edwin A. Leon
(74) *Attorney, Agent, or Firm* — Brownstein Hyatt Farber Schreck, LLP

(57) ABSTRACT

An electronic device, such as a watch, has a crown assembly having a shaft and a user-rotatable crown. The user-rotatable crown may include a conductive cap that is mechanically and electrically coupled to the shaft and functions as an electrode. The conductive cap may be coupled to the shaft using solder or another conductive attachment mechanism. The shaft may electrically couple the conductive cap to a processing unit of the electronic device. One or more additional electrodes may be positioned on the exterior surface of the electronic device. The conductive cap is operable to be contacted by a finger of a user of the electronic device while another electrode is positioned against skin of the user. The processing unit of the electronic device is operable to determine a biological parameter, such as an electrocardiogram, of the user based on voltages at the electrodes.

20 Claims, 17 Drawing Sheets

Related U.S. Application Data continuation of application No. 16/221,549, filed on Dec. 16, 2018, now Pat. No. 11,181,863.

(60) Provisional application No. 62/722,796, filed on Aug. 24, 2018.

(51) Int. Cl.

| | |
|---|---|
| ***G04G 17/04*** | (2006.01) |
| ***G04G 17/06*** | (2006.01) |
| ***G04G 17/08*** | (2006.01) |
| ***G04G 21/02*** | (2010.01) |
| ***G04G 21/08*** | (2010.01) |

(52) U.S. Cl.
CPC .......... *G04G 17/08* (2013.01); *G04G 21/025* (2013.01); *G04G 21/08* (2013.01)

(58) Field of Classification Search
CPC ........ G04C 3/005; G04C 3/001; H01H 3/122; H01H 9/16; H01H 25/008; H01H 2215/006; H01H 2221/01; H01H 25/06; H01H 2209/006; H01H 2223/002
See application file for complete search history.

(56) References Cited

U.S. PATENT DOCUMENTS

| | | | |
|---|---|---|---|
| 2,497,935 | A | 2/1950 | Feurer |
| 2,771,734 | A | 11/1956 | Morf |
| 2,788,236 | A | 4/1957 | Kafowi |
| 2,797,592 | A | 7/1957 | Marrapese |
| 3,040,514 | A | 6/1962 | Dinstman |
| 3,056,030 | A | 9/1962 | Kelchner |
| 3,130,539 | A | 4/1964 | Davis |
| 3,355,873 | A | 12/1967 | Morf |
| 3,362,154 | A | 1/1968 | Perret |
| 3,410,247 | A | 11/1968 | Dronberger |
| 3,495,398 | A | 2/1970 | Widmer et al. |
| 3,577,876 | A | 5/1971 | Spadini |
| 3,621,649 | A | 11/1971 | Vulcan et al. |
| 3,662,618 | A | 5/1972 | Kroll et al. |
| 3,733,803 | A | 5/1973 | Hiraga |
| 3,937,002 | A | 2/1976 | Van Haften |
| 4,007,347 | A | 2/1977 | Haber |
| 4,031,341 | A | 6/1977 | Wuthrich et al. |
| 4,037,068 | A | 7/1977 | Gaynor |
| 4,051,665 | A | 10/1977 | Arn |
| 4,077,200 | A | 3/1978 | Schneider |
| 4,133,404 | A | 1/1979 | Griffin |
| 4,170,104 | A | 10/1979 | Yamagata |
| 4,258,096 | A | 3/1981 | LaMarche |
| 4,274,152 | A | 6/1981 | Ikegami |
| 4,287,400 | A | 9/1981 | Kitik |
| 4,289,400 | A | 9/1981 | Kubola et al. |
| 4,311,026 | A | 1/1982 | Ochoa |
| 4,311,990 | A | 1/1982 | Burke |
| 4,324,956 | A | 4/1982 | Sakakino et al. |
| 4,345,119 | A | 8/1982 | Latasiewicz |
| 4,364,674 | A | 12/1982 | Tesch |
| 4,379,642 | A | 4/1983 | Meyrat |
| 4,395,134 | A | 7/1983 | Luce |
| 4,396,298 | A | 8/1983 | Ripley |
| 4,417,824 | A | 11/1983 | Paterson et al. |
| 4,448,199 | A | 5/1984 | Schmid |
| 4,520,306 | A | 5/1985 | Kirby |
| 4,581,509 | A | 4/1986 | Sanford et al. |
| 4,600,316 | A | 7/1986 | Besson |
| 4,617,461 | A | 10/1986 | Subbarao et al. |
| 4,634,861 | A | 1/1987 | Ching et al. |
| 4,641,026 | A | 2/1987 | Garcia, Jr. |
| 4,670,737 | A | 6/1987 | Rilling |
| 4,766,642 | A | 8/1988 | Gaffney et al. |
| 4,783,772 | A | 11/1988 | Umemoto et al. |
| 4,884,073 | A | 11/1989 | Souloumiac |
| 4,914,831 | A | 4/1990 | Kanezashi et al. |
| 4,922,070 | A | 5/1990 | Dorkinski |
| 4,931,794 | A | 6/1990 | Haag |
| 4,952,799 | A | 8/1990 | Loewen |
| 4,980,685 | A | 12/1990 | Souloumiac et al. |
| 4,987,299 | A | 1/1991 | Kobayashi et al. |
| 5,001,687 | A | 3/1991 | Brien |
| 5,034,602 | A | 7/1991 | Garcia et al. |
| 5,177,355 | A | 1/1993 | Branan |
| 5,214,278 | A | 5/1993 | Banda |
| 5,258,592 | A | 11/1993 | Nishikawa et al. |
| 5,288,993 | A | 2/1994 | Bidiville et al. |
| 5,347,123 | A | 9/1994 | Jackson et al. |
| 5,383,166 | A | 1/1995 | Gallay |
| 5,471,054 | A | 11/1995 | Watanabe |
| 5,477,508 | A | 12/1995 | Will |
| 5,509,174 | A | 4/1996 | Worrell |
| 5,559,761 | A | 9/1996 | Frenkel et al. |
| 5,572,314 | A | 11/1996 | Hyman et al. |
| 5,583,560 | A | 12/1996 | Florin et al. |
| 5,631,881 | A | 5/1997 | Pessey et al. |
| 5,726,645 | A | 3/1998 | Kamon et al. |
| 5,738,104 | A | 4/1998 | Lo |
| 5,748,111 | A | 5/1998 | Bates |
| 5,825,353 | A | 10/1998 | Will |
| 5,841,050 | A | 11/1998 | Clift et al. |
| 5,847,335 | A | 12/1998 | Sugahara et al. |
| 5,867,082 | A | 2/1999 | Van Zeeland |
| 5,943,233 | A | 8/1999 | Ebina |
| 5,953,001 | A | 9/1999 | Challener et al. |
| 5,960,366 | A | 9/1999 | Duwaer et al. |
| 5,963,332 | A | 10/1999 | Feldman et al. |
| 5,999,168 | A | 12/1999 | Rosenberg et al. |
| 6,069,567 | A | 5/2000 | Zawilski |
| 6,128,006 | A | 10/2000 | Rosenberg et al. |
| 6,134,189 | A | 10/2000 | Carrard |
| 6,154,201 | A | 11/2000 | Levin et al. |
| 6,175,679 | B1 | 1/2001 | Veligdan et al. |
| 6,203,190 | B1 | 3/2001 | Stotz |
| 6,241,684 | B1 | 6/2001 | Amano |
| 6,246,050 | B1 | 6/2001 | Tullis et al. |
| 6,252,825 | B1 | 6/2001 | Perotto |
| 6,304,247 | B1 | 10/2001 | Black |
| 6,355,891 | B1 | 3/2002 | Ikunami |
| 6,361,502 | B1 | 3/2002 | Puolakanaho et al. |
| 6,377,239 | B1 | 4/2002 | Isikawa |
| 6,392,640 | B1 | 5/2002 | Will |
| 6,396,006 | B1 | 5/2002 | Yokoji et al. |
| 6,422,740 | B1 | 7/2002 | Leuenberger |
| 6,477,117 | B1 | 11/2002 | Narayanaswami et al. |
| 6,502,982 | B1 | 1/2003 | Bach et al. |
| 6,525,278 | B2 | 2/2003 | Villain et al. |
| 6,556,222 | B1 | 4/2003 | Narayanaswami |
| 6,575,618 | B1 | 6/2003 | Inoue et al. |
| 6,587,400 | B1 | 7/2003 | Line |
| 6,636,197 | B1 | 10/2003 | Goldenberg et al. |
| 6,646,635 | B2 | 11/2003 | Pogatetz et al. |
| 6,661,438 | B1 | 11/2003 | Shiraishi et al. |
| 6,672,758 | B2 * | 1/2004 | Ehrsam .................... G04B 3/04 368/216 |
| 6,794,992 | B1 | 9/2004 | Rogers |
| 6,809,275 | B1 | 10/2004 | Cheng et al. |
| 6,834,430 | B2 | 12/2004 | Worrell |
| 6,846,998 | B2 | 1/2005 | Hasumi et al. |
| 6,882,596 | B2 | 4/2005 | Guanter |
| 6,888,076 | B2 | 5/2005 | Hetherington |
| 6,896,403 | B1 | 5/2005 | Gau |
| 6,909,378 | B1 | 6/2005 | Lambrechts et al. |
| 6,914,551 | B2 | 7/2005 | Vidal |
| 6,961,099 | B2 | 11/2005 | Takano et al. |
| 6,963,039 | B1 | 11/2005 | Weng et al. |
| 6,967,903 | B2 | 11/2005 | Guanter |
| 6,977,868 | B2 | 12/2005 | Brewer et al. |
| 6,982,930 | B1 | 1/2006 | Hung |
| 6,985,107 | B2 | 1/2006 | Anson |
| 6,987,568 | B2 | 1/2006 | Dana |
| 6,998,553 | B2 | 2/2006 | Hisamune et al. |
| 7,009,915 | B2 | 3/2006 | Brewer et al. |
| 7,016,263 | B2 | 3/2006 | Gueissaz et al. |

(56) References Cited

U.S. PATENT DOCUMENTS 7,021,442 B2 4/2006 Borgerson
7,031,228 B2 4/2006 Born et al.
7,034,237 B2 4/2006 Ferri et al.
7,081,905 B1 7/2006 Raghunath et al.
7,102,626 B2 9/2006 Denny, III
7,106,307 B2 9/2006 Cok
7,111,365 B1 9/2006 Howie, Jr.
7,113,450 B2 9/2006 Plancon et al.
7,119,289 B2 10/2006 Lacroix
7,135,673 B2 11/2006 Saint Clair
7,167,083 B2 1/2007 Giles
7,187,359 B2 3/2007 Numata
7,244,927 B2 7/2007 Huynh
7,255,473 B2 8/2007 Hiranuma et al.
7,265,336 B2 9/2007 Hataguchi et al.
7,274,303 B2 9/2007 Dresti et al.
7,285,738 B2 10/2007 Lavigne et al.
7,286,063 B2 10/2007 Gauthey
7,292,741 B2 11/2007 Ishiyama et al.
7,358,481 B2 4/2008 Yeoh et al.
7,369,308 B2 5/2008 Tsuruta et al.
7,371,745 B2 5/2008 Ebright et al.
7,385,874 B2 6/2008 Vuilleumier
7,404,667 B2 7/2008 Born et al.
7,465,917 B2 12/2008 Chin et al.
7,468,036 B1 12/2008 Rulkov et al.
7,506,269 B2 3/2009 Lang et al.
7,520,664 B2 4/2009 Wai
7,528,824 B2 5/2009 Kong
7,545,367 B2 6/2009 Sunda et al.
7,591,582 B2 9/2009 Hiranuma et al.
7,593,755 B2 9/2009 Colando et al.
7,605,846 B2 10/2009 Watanabe
7,634,263 B2 12/2009 Louch et al.
7,646,677 B2 1/2010 Nakamura
7,655,874 B2 2/2010 Akieda
7,682,070 B2 3/2010 Burton
7,708,457 B2 5/2010 Girardin
7,710,456 B2 5/2010 Koshiba et al.
7,732,724 B2 6/2010 Otani et al.
7,761,246 B2 7/2010 Matsui
7,763,819 B2 7/2010 Ieda et al.
7,772,507 B2 8/2010 Orr
7,778,115 B2 8/2010 Ruchonnet
7,781,726 B2 8/2010 Matsui et al.
RE41,637 E 9/2010 O'Hara et al.
7,791,587 B2 9/2010 Kosugi
7,791,588 B2 9/2010 Tierling et al.
7,791,597 B2 9/2010 Silverstein et al.
7,822,469 B2 10/2010 Lo
7,856,255 B2 12/2010 Tsuchiya et al.
7,858,583 B2 12/2010 Schmidt et al.
7,865,324 B2 1/2011 Lindberg
7,894,957 B2 2/2011 Carlson
7,946,758 B2 5/2011 Mooring
8,063,892 B2 11/2011 Shahoian et al.
8,138,488 B2 3/2012 Grot
8,143,981 B2 3/2012 Washizu et al.
8,167,126 B2 5/2012 Stiehl
8,169,402 B2 5/2012 Shahoian et al.
8,188,989 B2 5/2012 Levin et al.
8,195,313 B1 6/2012 Fadell et al.
8,220,987 B2 7/2012 Kimura et al.
8,229,535 B2 7/2012 Mensinger et al.
8,248,815 B2 8/2012 Yang et al.
8,263,886 B2 9/2012 Lin et al.
8,263,889 B2 9/2012 Takahashi et al.
8,275,327 B2 9/2012 Yi et al.
8,294,670 B2 10/2012 Griffin et al.
8,312,495 B2 11/2012 Vanderhoff
8,318,340 B2 11/2012 Stimits
8,368,677 B2 2/2013 Yamamoto
8,371,745 B2 2/2013 Manni
8,373,661 B2 2/2013 Lan et al.
8,405,618 B2 3/2013 Colgate
8,410,971 B2 4/2013 Friedlander
8,432,368 B2 4/2013 Momeyer et al.
8,439,559 B2 5/2013 Luk et al.
8,441,450 B2 5/2013 Degner et al.
8,446,713 B2 5/2013 Lai
8,456,430 B2 6/2013 Oliver et al.
8,477,118 B2 7/2013 Lan et al.
8,493,190 B2 7/2013 Periquet et al.
8,508,511 B2 8/2013 Tanaka et al.
8,525,777 B2 9/2013 Stavely et al.
8,562,489 B2 10/2013 Burton et al.
8,568,313 B2 10/2013 Sadhu
8,576,044 B2 11/2013 Chapman
8,593,598 B2 11/2013 Chen et al.
8,607,662 B2 12/2013 Huang
8,614,881 B2 12/2013 Yoo
8,624,836 B1 1/2014 Miller et al.
8,666,682 B2 3/2014 LaVigne et al.
8,677,285 B2 3/2014 Tsern et al.
8,704,787 B2 4/2014 Yamamoto
8,711,093 B2 4/2014 Ong et al.
8,717,151 B2 5/2014 Forutanpour et al.
8,724,087 B2 5/2014 Van De Kerkhof et al.
8,730,167 B2 5/2014 Ming et al.
8,743,088 B2 6/2014 Watanabe
8,783,944 B2 7/2014 Doi
8,797,153 B2 8/2014 Vanhelle et al.
8,804,993 B2 8/2014 Shukla et al.
8,816,962 B2 8/2014 Obermeyer et al.
8,824,245 B2 9/2014 Lau et al.
8,847,741 B2 9/2014 Birnbaum et al.
8,851,372 B2 10/2014 Zhou
8,859,971 B2 10/2014 Weber
8,860,674 B2 10/2014 Lee et al.
8,863,219 B2 10/2014 Brown et al.
D717,679 S 11/2014 Anderssen
8,878,657 B2 11/2014 Periquet et al.
8,885,856 B2 11/2014 Sacha
8,895,911 B2 11/2014 Takahashi
8,905,631 B2 12/2014 Sakurazawa et al.
8,908,477 B2 12/2014 Peters
8,920,022 B2 12/2014 Ishida et al.
8,922,399 B2 12/2014 Bajaj et al.
8,928,452 B2 1/2015 Kim et al.
8,948,832 B2 2/2015 Hong et al.
8,954,135 B2 2/2015 Yuen et al.
8,975,543 B2 3/2015 Hakemeyer
8,994,827 B2 3/2015 Mistry et al.
9,001,625 B2 4/2015 Essery et al.
9,024,733 B2 5/2015 Wouters
9,028,134 B2 5/2015 Koshoji et al.
9,030,446 B2 5/2015 Mistry et al.
9,034,666 B2 5/2015 Vaganov et al.
9,039,614 B2 5/2015 Yuen et al.
9,041,663 B2 5/2015 Westerman
9,042,971 B2 5/2015 Brumback et al.
9,049,998 B2 6/2015 Brumback et al.
9,052,696 B2 6/2015 Breuillot et al.
9,086,717 B2 7/2015 Meerovitsch
9,086,738 B2 7/2015 Leung et al.
9,091,309 B2 7/2015 Battlogg
9,100,493 B1 8/2015 Zhou
9,101,184 B2 8/2015 Wilson
9,105,413 B2 8/2015 Hiranuma et al.
9,123,483 B2 9/2015 Ferri et al.
9,134,807 B2 9/2015 Shaw et al.
9,141,087 B2 9/2015 Brown et al.
9,176,577 B2 11/2015 Jangaard et al.
9,176,598 B2 11/2015 Sweetser et al.
9,202,372 B2 12/2015 Reams et al.
9,213,409 B2 12/2015 Redelsheimer et al.
9,223,296 B2 12/2015 Yang et al.
9,241,635 B2 1/2016 Yuen et al.
9,244,438 B2 1/2016 Hoover et al.
9,256,209 B2 2/2016 Yang et al.
9,277,156 B2 3/2016 Bennett et al.
9,348,322 B2 * 5/2016 Fraser .................... G01J 1/0411
9,350,850 B2 5/2016 Pope et al.
9,367,146 B2 6/2016 Piot

(56) References Cited

U.S. PATENT DOCUMENTS

| | | | |
|---|---|---|---|
| 9,386,932 | B2 | 7/2016 | Chatterjee et al. |
| 9,426,275 | B2 | 8/2016 | Eim et al. |
| 9,430,042 | B2 | 8/2016 | Levin |
| 9,437,357 | B2 | 9/2016 | Furuki et al. |
| 9,449,770 | B2 | 9/2016 | Sanford et al. |
| 9,501,044 | B2 | 11/2016 | Jackson et al. |
| 9,520,100 | B2 | 12/2016 | Houjou et al. |
| 9,532,723 | B2 | 1/2017 | Kim |
| 9,542,016 | B2 | 1/2017 | Armstrong-Muntner |
| 9,545,541 | B2 | 1/2017 | Aragones et al. |
| 9,552,023 | B2 | 1/2017 | Joo et al. |
| 9,599,964 | B2 | 3/2017 | Gracia |
| 9,600,071 | B2 | 3/2017 | Rothkopf |
| 9,607,505 | B2 | 3/2017 | Rothkopf et al. |
| 9,620,312 | B2 | 4/2017 | Ely et al. |
| 9,627,163 | B2 | 4/2017 | Ely |
| 9,632,318 | B2 | 4/2017 | Goto et al. |
| 9,632,537 | B2 | 4/2017 | Memering |
| 9,638,587 | B2 | 5/2017 | Marquas et al. |
| 9,651,922 | B2 | 5/2017 | Hysek et al. |
| 9,659,482 | B2 | 5/2017 | Yang et al. |
| 9,680,831 | B2 | 6/2017 | Jooste et al. |
| 9,709,956 | B1 | 7/2017 | Ely et al. |
| 9,753,436 | B2 | 9/2017 | Ely et al. |
| D800,172 | S | 10/2017 | Akana |
| 9,800,717 | B2 | 10/2017 | Ma et al. |
| 9,836,025 | B2 | 12/2017 | Ely et al. |
| 9,873,711 | B2 | 1/2018 | Hoover et al. |
| 9,874,945 | B2 | 1/2018 | Fukumoto |
| 9,886,006 | B2 | 2/2018 | Ely et al. |
| 9,891,590 | B2 | 2/2018 | Shim et al. |
| 9,891,651 | B2 | 2/2018 | Jackson et al. |
| 9,898,032 | B2 | 2/2018 | Hafez et al. |
| 9,927,902 | B2 | 3/2018 | Burr et al. |
| 9,939,923 | B2 | 4/2018 | Sharma |
| 9,946,297 | B2 | 4/2018 | Nazzaro et al. |
| 9,952,558 | B2 | 4/2018 | Ely |
| 9,952,682 | B2 | 4/2018 | Zhang et al. |
| 9,971,305 | B2 | 5/2018 | Ely et al. |
| 9,971,405 | B2 | 5/2018 | Salo et al. |
| 9,971,407 | B2 | 5/2018 | Holenarsipur et al. |
| 9,979,426 | B2 | 5/2018 | Na et al. |
| 10,001,817 | B2 | 6/2018 | Zambetti et al. |
| 10,012,550 | B2 | 7/2018 | Yang |
| 10,018,966 | B2 | 7/2018 | Ely et al. |
| 10,019,097 | B2 | 7/2018 | Ely et al. |
| 10,037,006 | B2 | 7/2018 | Ely |
| 10,037,081 | B2 | 7/2018 | Grant |
| 10,048,802 | B2 | 8/2018 | Shedletsky |
| 10,061,399 | B2 | 8/2018 | Bushnell et al. |
| 10,066,970 | B2 | 9/2018 | Gowreesunker et al. |
| 10,092,203 | B2 | 10/2018 | Mirov |
| 10,108,016 | B2 | 10/2018 | Bosveld |
| 10,114,342 | B2 | 10/2018 | Kim et al. |
| 10,145,711 | B2 | 12/2018 | Boonsom et al. |
| 10,175,652 | B2 | 1/2019 | Ely et al. |
| 10,190,891 | B1 | 1/2019 | Rothkopf et al. |
| 10,203,662 | B1 | 2/2019 | Lin et al. |
| 10,209,148 | B2 | 2/2019 | Lyon et al. |
| 10,216,147 | B2 | 2/2019 | Ely et al. |
| 10,222,755 | B2 | 3/2019 | Coakley et al. |
| 10,222,756 | B2 | 3/2019 | Ely et al. |
| 10,222,909 | B2 | 3/2019 | Shedletsky et al. |
| 10,234,828 | B2 | 3/2019 | Ely et al. |
| 10,241,593 | B2 | 3/2019 | Chen |
| 10,274,905 | B2 | 4/2019 | Chung |
| 10,296,125 | B2 | 5/2019 | Ely et al. |
| 10,331,081 | B2 | 6/2019 | Ely et al. |
| 10,331,082 | B2 | 6/2019 | Ely et al. |
| 10,353,487 | B2 | 7/2019 | Chung et al. |
| 10,379,629 | B2 | 8/2019 | Bushnell et al. |
| 10,386,940 | B2 | 8/2019 | Kim |
| 10,401,961 | B2 | 9/2019 | Cruz-Hernandez et al. |
| 10,429,959 | B2 | 10/2019 | Battlogg |
| 10,474,194 | B1 | 11/2019 | Ell et al. |
| 10,503,258 | B2 | 12/2019 | Holenarsipur et al. |
| 10,509,486 | B2 | 12/2019 | Bushnell et al. |
| 10,524,671 | B2 | 1/2020 | Lamego |
| 10,534,320 | B2 | 1/2020 | Ferri et al. |
| 10,534,900 | B2 | 1/2020 | Cheong et al. |
| 10,551,798 | B1 | 2/2020 | Bushnell et al. |
| 10,572,053 | B2 | 2/2020 | Ely et al. |
| 10,579,090 | B2 | 3/2020 | Jackson et al. |
| 10,599,101 | B2 | 3/2020 | Rothkopf et al. |
| 10,610,157 | B2 | 4/2020 | Pandya et al. |
| 10,613,685 | B2 | 4/2020 | Shedletsky |
| 10,627,783 | B2 | 4/2020 | Rothkopf et al. |
| 10,655,988 | B2 | 5/2020 | Boonsom et al. |
| 10,664,074 | B2 | 5/2020 | Moussette et al. |
| 10,732,571 | B2 | 8/2020 | Ely et al. |
| 10,765,019 | B2 | 9/2020 | Werner |
| 10,845,764 | B2 | 11/2020 | Ely et al. |
| 10,852,700 | B2 | 12/2020 | Abramov |
| 10,852,855 | B2 | 12/2020 | Niu |
| 10,871,385 | B2 | 12/2020 | Kok |
| 10,884,549 | B2 | 1/2021 | Shedletsky et al. |
| 10,936,071 | B2 | 3/2021 | Pandya et al. |
| 10,942,491 | B2 | 3/2021 | Rothkopf |
| 10,955,937 | B2 | 3/2021 | Bushnell et al. |
| 10,962,930 | B2 | 3/2021 | Ely et al. |
| 10,962,935 | B1 | 3/2021 | Ely et al. |
| 10,987,054 | B2 | 4/2021 | Pandya et al. |
| 11,002,572 | B2 | 5/2021 | Boonsom et al. |
| 11,029,831 | B2 | 6/2021 | Block et al. |
| 11,148,292 | B2 | 10/2021 | Bryner et al. |
| 11,181,863 | B2 | 11/2021 | Ely et al. |
| 11,194,298 | B2 | 12/2021 | Roach et al. |
| 11,194,299 | B1 | 12/2021 | Herrera |
| 11,209,777 | B2 | 12/2021 | Minakuchi et al. |
| 11,221,590 | B2 | 1/2022 | Rothkopf et al. |
| 11,347,189 | B1 | 5/2022 | Herrera et al. |
| 11,347,351 | B2 | 6/2022 | Shedletsky et al. |
| 11,350,869 | B2 | 6/2022 | Rasmussen et al. |
| 11,360,440 | B2 | 6/2022 | Perkins et al. |
| 11,385,599 | B2 | 7/2022 | Ely et al. |
| 11,474,483 | B2 | 10/2022 | Rothkopf |
| 11,513,613 | B2 | 11/2022 | Bushnell et al. |
| 11,531,306 | B2 | 12/2022 | Ely et al. |
| 11,537,082 | B2 | 12/2022 | Ferri et al. |
| 11,550,268 | B2 | 1/2023 | Pandya et al. |
| 11,556,095 | B2 | 1/2023 | Hiemstra et al. |
| 11,561,515 | B2 | 1/2023 | Beyhs |
| 11,669,205 | B2 | 6/2023 | Shedletsky et al. |
| 11,720,064 | B2 | 8/2023 | Ely |
| 11,762,342 | B2 | 9/2023 | Rothkopf et al. |
| 11,796,961 | B2 * | 10/2023 | Ely ...................... G04G 17/045 |
| 11,860,587 | B2 | 1/2024 | Taylor et al. |
| 12,045,416 | B2 | 7/2024 | Shedletsky et al. |
| 2002/0101457 | A1 | 8/2002 | Lang |
| 2003/0174590 | A1 | 9/2003 | Arikawa et al. |
| 2004/0047244 | A1 | 3/2004 | Iino et al. |
| 2004/0082414 | A1 | 4/2004 | Knox |
| 2004/0130971 | A1 | 7/2004 | Ecoffet et al. |
| 2004/0264301 | A1 | 12/2004 | Howard et al. |
| 2005/0075558 | A1 | 4/2005 | Vecerina et al. |
| 2005/0088417 | A1 | 4/2005 | Mulligan |
| 2006/0250377 | A1 | 11/2006 | Zadesky et al. |
| 2007/0013775 | A1 | 1/2007 | Shin |
| 2007/0050054 | A1 | 3/2007 | Sambandam Guruparan et al. |
| 2007/0182708 | A1 | 8/2007 | Poupyrev et al. |
| 2007/0211042 | A1 | 9/2007 | Kim et al. |
| 2007/0222756 | A1 | 9/2007 | Wu et al. |
| 2007/0229671 | A1 | 10/2007 | Takeshita et al. |
| 2007/0247421 | A1 | 10/2007 | Orsley et al. |
| 2008/0130914 | A1 | 6/2008 | Cho |
| 2008/0181059 | A1 | 7/2008 | Wai |
| 2008/0185272 | A1 | 8/2008 | Otani et al. |
| 2009/0051649 | A1 | 2/2009 | Rondel |
| 2009/0073119 | A1 | 3/2009 | Le et al. |
| 2009/0115748 | A1 | 5/2009 | Tanaka et al. |
| 2009/0122656 | A1 | 5/2009 | Bonnet et al. |
| 2009/0146975 | A1 | 6/2009 | Chang |
| 2009/0152452 | A1 | 6/2009 | Lee et al. |
| 2009/0217207 | A1 | 8/2009 | Kagermeier et al. |

(56) References Cited

U.S. PATENT DOCUMENTS

2009/0285443 A1 11/2009 Camp et al.
2009/0312051 A1 12/2009 Hansson et al.
2009/0312655 A1 12/2009 Lo
2010/0033430 A1 2/2010 Kakutani et al.
2010/0053468 A1 3/2010 Havrill
2010/0079225 A1 4/2010 Washizu et al.
2010/0081375 A1 4/2010 Rosenblatt et al.
2010/0149099 A1 6/2010 Elias
2011/0007468 A1 1/2011 Burton et al.
2011/0090148 A1 4/2011 Li et al.
2011/0158057 A1 6/2011 Brewer et al.
2011/0199301 A1 8/2011 Zhao et al.
2011/0242064 A1 10/2011 Ono et al.
2011/0249378 A1 10/2011 Yoo
2011/0270358 A1 11/2011 Davis et al.
2012/0067711 A1 3/2012 Yang
2012/0068857 A1 3/2012 Rothkopf et al.
2012/0075082 A1 3/2012 Rothkopf et al.
2012/0112859 A1 5/2012 Park et al.
2012/0113044 A1 5/2012 Strazisar et al.
2012/0206248 A1 8/2012 Biggs
2012/0272784 A1 11/2012 Bailey et al.
2013/0037396 A1 2/2013 Yu
2013/0087443 A1 4/2013 Kikuchi
2013/0191220 A1 7/2013 Dent et al.
2013/0235704 A1 9/2013 Grinberg
2013/0261405 A1 10/2013 Lee et al.
2013/0335196 A1 12/2013 Zhang et al.
2014/0009397 A1 1/2014 Gillespie
2014/0045547 A1 2/2014 Singamsetty et al.
2014/0071098 A1 3/2014 You
2014/0073486 A1 3/2014 Ahmed et al.
2014/0132516 A1 5/2014 Tsai et al.
2014/0197936 A1 7/2014 Biggs et al.
2014/0275852 A1 9/2014 Hong
2014/0340318 A1 11/2014 Stringer et al.
2014/0347289 A1 11/2014 Suh et al.
2014/0368442 A1 12/2014 Vahtola
2014/0375579 A1 12/2014 Fujiwara
2015/0041289 A1 2/2015 Ely et al.
2015/0049059 A1 2/2015 Zadesky et al.
2015/0098309 A1 4/2015 Adams et al.
2015/0124415 A1 5/2015 Goyal et al.
2015/0186609 A1 7/2015 Utter, II
2015/0221460 A1 8/2015 Teplitxky et al.
2015/0293592 A1 10/2015 Cheong
2015/0320346 A1 11/2015 Chen
2015/0338642 A1 11/2015 Sanford
2015/0366098 A1 12/2015 Lapetina et al.
2016/0018846 A1 1/2016 Zenoff
2016/0054813 A1 2/2016 Shediwy et al.
2016/0058375 A1 3/2016 Rothkopf et al.
2016/0061636 A1 3/2016 Gowreesunker et al.
2016/0062623 A1 3/2016 Howard et al.
2016/0069713 A1 3/2016 Ruh et al.
2016/0109861 A1 4/2016 Kim et al.
2016/0116306 A1 4/2016 Ferri et al.
2016/0147432 A1 5/2016 Shi et al.
2016/0170598 A1 6/2016 Zambetti et al.
2016/0170608 A1 6/2016 Zambetti et al.
2016/0170624 A1 6/2016 Zambetti et al.
2016/0241688 A1 8/2016 Vossoughi
2016/0253487 A1 9/2016 Sarkar et al.
2016/0306446 A1 10/2016 Chung et al.
2016/0320583 A1 11/2016 Hall, Jr.
2016/0327911 A1 11/2016 Eim et al.
2016/0338642 A1 11/2016 Parara et al.
2016/0378069 A1 12/2016 Rothkopf et al.
2016/0378070 A1 12/2016 Rothkopf et al.
2016/0378071 A1 12/2016 Rothkopf et al.
2017/0011210 A1 1/2017 Cheong et al.
2017/0027461 A1 2/2017 Shin et al.
2017/0031449 A1 2/2017 Karsten et al.
2017/0045958 A1 2/2017 Battlogg et al.
2017/0061863 A1 3/2017 Eguchi
2017/0069443 A1 3/2017 Wang et al.
2017/0069444 A1 3/2017 Wang et al.
2017/0069447 A1 3/2017 Wang et al.
2017/0090572 A1 3/2017 Holenarsipur
2017/0090599 A1 3/2017 Bokma et al.
2017/0104902 A1 4/2017 Kim et al.
2017/0139489 A1 5/2017 Chen et al.
2017/0216519 A1 8/2017 Vouillamoz
2017/0216668 A1 8/2017 Burton et al.
2017/0238138 A1 8/2017 Aminzade
2017/0251561 A1 8/2017 Fleck et al.
2017/0269715 A1 9/2017 Kim et al.
2017/0285404 A1 10/2017 Kubota et al.
2017/0301314 A1 10/2017 Kim et al.
2017/0307414 A1 10/2017 Ferri et al.
2017/0331869 A1 11/2017 Bendahan et al.
2017/0357465 A1 12/2017 Dzeryn et al.
2018/0018026 A1 1/2018 Bushnell et al.
2018/0136686 A1 5/2018 Jackson et al.
2018/0196517 A1 7/2018 Tan et al.
2018/0225701 A1 8/2018 Han
2018/0235491 A1 8/2018 Bayley et al.
2018/0239306 A1 8/2018 Ely
2018/0299834 A1 10/2018 Ely et al.
2018/0307363 A1 10/2018 Ely et al.
2018/0329368 A1 11/2018 Ely et al.
2018/0335891 A1 11/2018 Shedletsky et al.
2018/0337551 A1 11/2018 Park
2018/0341342 A1 11/2018 Bushnell et al.
2018/0364815 A1 12/2018 Moussette et al.
2019/0017846 A1 1/2019 Boonsom et al.
2019/0072902 A1 3/2019 Ely et al.
2019/0072911 A1 3/2019 Ely et al.
2019/0072912 A1 3/2019 Pandya et al.
2019/0082547 A1 3/2019 Werner et al.
2019/0146415 A1 5/2019 Ely et al.
2019/0163324 A1 5/2019 Shedletsky
2019/0250754 A1 8/2019 Ely et al.
2019/0278232 A1 9/2019 Ely et al.
2019/0294117 A1 9/2019 Ely et al.
2019/0302902 A1 10/2019 Bushnell et al.
2019/0317454 A1 10/2019 Holenarsipur et al.
2019/0391539 A1 12/2019 Perkins et al.
2020/0041962 A1 2/2020 Beyhs
2020/0064774 A1 2/2020 Ely et al.
2020/0064779 A1 2/2020 Pandya et al.
2020/0073339 A1 3/2020 Roach et al.
2020/0110473 A1 4/2020 Bushnell et al.
2020/0150815 A1 5/2020 Ely et al.
2020/0159172 A1 5/2020 Bushnell et al.
2020/0233380 A1 7/2020 Rothkopf
2020/0233529 A1 7/2020 Shedletsky et al.
2020/0271483 A1 8/2020 Boonsom
2020/0326659 A1 10/2020 Ely et al.
2021/0055696 A1 2/2021 Ely
2021/0060783 A1 3/2021 Bryner et al.
2021/0096688 A1 4/2021 Shedletsky et al.
2021/0181682 A1 6/2021 Ely et al.
2021/0181688 A1 6/2021 Ely et al.
2021/0181690 A1 6/2021 Rothkopf et al.
2021/0181691 A1 6/2021 Rothkopf et al.
2021/0181692 A1 6/2021 Rothkopf et al.
2021/0181865 A1 6/2021 Bushnell et al.
2021/0255590 A1 8/2021 Ely et al.
2021/0325168 A1 10/2021 Lv et al.
2021/0373501 A1 12/2021 Pandya et al.
2022/0043397 A1 2/2022 Ely et al.
2022/0043402 A1 2/2022 Roach et al.
2022/0074731 A1 3/2022 Jang et al.
2022/0075328 A1 3/2022 Taylor
2022/0171344 A1 6/2022 Rothkopf et al.
2023/0013283 A1 1/2023 Herrera et al.
2023/0161299 A1 5/2023 Beyhs
2023/0168635 A1 6/2023 Hiemstra et al.
2023/0213893 A1 7/2023 Rothkopf et al.
2023/0259235 A1 8/2023 Shedletsky et al.
2023/0393536 A1 12/2023 Perkins et al.
2023/0408984 A1 12/2023 Liang et al.
2023/0418230 A1 12/2023 Ely et al.

(56) References Cited

U.S. PATENT DOCUMENTS

| | | | |
|---|---|---|---|
| 2024/0036523 | A1 | 2/2024 | Pandya et al. |
| 2024/0045383 | A1 | 2/2024 | Roach et al. |
| 2024/0126219 | A1 | 4/2024 | Taylor et al. |
| 2024/0152100 | A1 | 5/2024 | Beyhs |
| 2024/0192804 | A1 | 6/2024 | Shedletsky et al. |
| 2024/0264568 | A1 | 8/2024 | Ely |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 111752138 | 10/2020 |
| CN | 215494568 | 1/2022 |
| CN | 218675709 | 3/2023 |
| DE | 2352016 | 4/1975 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |

(56) References Cited

FOREIGN PATENT DOCUMENTS

| | | |
|---|---|---|
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2016532266 | 10/2016 |
| JP | 2018510451 | 4/2018 |
| KR | 20010030477 | 4/2001 |
| KR | 200278568 | 3/2002 |
| KR | 20030083340 | 10/2003 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| KR | 1020170127744 | 11/2017 |
| KR | 102136836 | 7/2020 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO2015/116111 | 8/2015 |
| WO | WO2015122885 | 8/2015 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |
| WO | WO2016208835 | 12/2016 |
| WO | WO2017/013278 | 1/2017 |
| WO | WO2019/050778 | 3/2019 |
| WO | WO2020173085 | 9/2020 |

OTHER PUBLICATIONS

Author Unknown, “Fossil Q ups smartwatch game with handsome design and build,” Business Mirror, Makati City, Philippines, 3 pages, Dec. 20, 2016.
Author Unknown, “How Vesag Helps Kids Women and Visitors,” http://www.sooperarticles.com/health-fitness-articles/children-health-articles/how-vesag-helps-kids-women-visitors-218542.html, 2 pages, at least as early as May 20, 2015.
Author Unknown, “mHealth,” http://mhealth.vesag.com/?m=201012, 7 pages, Dec. 23, 2010.
Author Unknown, “mHealth Summit 2010,” http://www.virtualpressoffice.com/eventsSubmenu.do?page=exhibitorPage&showId=1551&companyId=5394, 5 pages, Nov. 18, 2010.
Author Unknown, “MyKronoz ZeTime: World’s Most Funded Hybrid Smartwatch Raised over $3M on Kickstarter, Running until April 27th,” Business Wire, New York, New York, 3 pages, Apr. 21, 2017.
Author Unknown, “RedEye mini Plug-in Universal Remote Adapter for iPhone, iPod touch and iPad,” Amazon.com, 4 pages, date unknown.
Author Unknown, “Re iPhone Universal Remote Controll—Infrared Remote Control Accessory for iphone and ipod touch,” http://www.amazon.com/iPhone-Universal- Remote-Control-Accessory/dp/tech-data/B0038Z4 . . . , 2 pages, at least as early as Jul. 15, 2010.
Author Unknown, “Vesag Wrist Watch for Dementia Care from VYZIN,” http://vyasa-kaaranam-ketkadey.blogspot.com/2011/03/vesag-wrist-watch-for-dementia-care.html, 2 pages, Mar. 31, 2011.
Author Unknown, “Vyzin Electronics Private Limited launches Vesag Watch,” http://www.virtualpressoffice.com/showJointPage.do?page=jp&showId=1544, 5 pages, Jan. 6, 2011.
Author Unknown, “Vyzin Unveiled Personal Emergency Response System (PERS) with Remote Health Monitoring That Can Be Used for Entire Family,” http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, “DeskThorityNet, Optical Switch Keyboards,” http://deskthority.net/keyboards-f2/optical-switch-keyboards-t1474.html, 22 pages, Jul. 11, 2015.
Epstein et al., “Economical, High-Performance Optical Encoders,” Hewlett-Packard Journal, pp. 99-106, Oct. 1988. [text only version].
GreyB, “Google Watch: Convert your arm into a keyboard,” http://www.whatafuture.com/2014/02/28/google-smartwatch/#sthash.Yk35cDXK.dpbs, 3 pages, Feb. 28, 2014.
IBM, “Additional Functionality Added to Cell Phone via “Learning” Function Button,” www.ip.com, 2 pages, Feb. 21, 2007.
Kim, Joseph, “2010 mHealth Summit Emerges as Major One-Stop U.S. Venue for Mobile Health,” http://www.medicineandtechnology.com/2010/08/2010-mhealth-summit-emerges-as-major.html, 3 pages, Aug. 26, 2010.
Krishnan et al., “A Miniature Surface Mount Reflective Optical Shaft Encoder,” Hewlett-Packard Journal, Article 8, pp. 1-6, Dec. 1996.
Narayanaswami et al., “Challenges and considerations for the design and production of a purpose-optimized body-worn wrist-watch computer,” Defense, Security, and Cockpit Displays, 2004.
M.T. Raghunath et al., User Interfaces for Applications on a Wrist Watch, Personal and Ubiquitous Computing, vol. 6, No. 1, 2002, Springer.
Rick, “How VESAG Helps Health Conscious Citizens,” http://sensetekgroup.com/2010/11/29/wireless-health-monitoring-system/, 2 pages, Nov. 29, 2010.
Sadhu, Rajendra, “How VESAG Helps People Who Want to ‘Be There’?,” http://ezinearticles.com/?How-Vesag-Helps-People-Who-Want-to-Be-There?&id-5423873, 1 page, Nov. 22, 2010.
Sadhu, Rajendra, “Mobile Innovation Helps Dementia and Alzheimer’s Patients,” http://www.itnewsafrica.com/2010/11/mobile-innovation-helps-dementia-andalzheimer%E2%80%99s-patients/, 3 pages, Nov. 22, 2010.
Sherr, Sol, “Input Devices,” p. 55, Mar. 1988.
Tran et al., “Universal Programmable Remote Control/Telephone,” www.ip.com, 2 pages, May 1, 1992.

* cited by examiner

CONDUCTIVE CAP FOR WATCH CROWN

CROSS-REFERENCE TO RELATED APPLICATIONS

This application is a continuation of patent application of U.S. Non-provisional patent application Ser. No. 17/507,381, filed Oct. 21, 2021 and titled "Conductive Cap for Watch Crown," which is a continuation patent application of U.S. Non-provisional patent application Ser. No. 16/221,549, filed Dec. 16, 2018 and titled "Conductive Cap for Watch Crown," now U.S. Pat. No. 11,181,863, issued Nov. 23, 2021, which claims the benefit of U.S. Provisional Patent Application No. 62/722,796, filed Aug. 24, 2018 and titled "Conductive Cap for Watch Crown," the disclosures of which are hereby incorporated herein by reference in their entirety.

FIELD

The described embodiments relate generally to an electronic watch or other electronic device (e.g., another type of wearable electronic device). More particularly, the described embodiments relate to techniques for providing, on or as part of a watch or other wearable electronic device, a crown assembly that includes a shaft and a separate conductive cap.

BACKGROUND

A crown assembly for a watch may be rotated or translated to provide inputs to the electronic device. The crown assembly may be electrically conductive to determine a set of biological parameters of a user that wears the watch or other electronic device. Providing a unitary component that forms an exterior surface and a shaft of a crown assembly results in complex processes for material selection, manufacturing, and finishing.

SUMMARY

Embodiments of the systems, devices, methods, and apparatuses described in the present disclosure are directed to an electronic watch or other electronic device (e.g., another type of wearable electronic device) having a crown assembly that includes a conductive cap that is mechanically and electrically coupled to a shaft.

In a first aspect, the present disclosure describes an electronic watch. The electronic watch includes a housing. The electronic watch further includes a crown assembly. The crown assembly includes a user-rotatable crown comprising a conductive cap, a crown body at least partially surrounding the conductive cap, and an isolating component positioned between the conductive cap and the crown body. The crown assembly further includes a shaft extending through an opening in the housing and mechanically and electrically coupled to the conductive cap. A processing unit of the electronic watch is coupled to the conductive cap by the shaft and is operable to determine a biological parameter of a user based on a voltage at the conductive cap.

In another aspect, the present disclosure describes an electronic watch. The electronic watch includes a housing defining an opening and a processing unit disposed within the housing. An electrode is disposed on a surface of the housing and is configured to detect a first voltage. The electronic watch further includes a user-rotatable crown that includes a crown body defining a cavity and a second electrode disposed in the cavity and configured to detect a second voltage. The electronic watch further includes a shaft mechanically coupled to the crown body, extending through the opening in the housing, and configured to electrically couple the second electrode and the processing unit. The electronic watch further includes an attachment mechanism mechanically and electrically coupling the second electrode and the shaft. The processing unit is configured to generate an electrocardiogram using the first and second voltages.

In still another aspect of the disclosure, another electronic watch is described. The electronic watch includes a housing defining an opening and a processing unit disposed in the housing. The electronic watch further includes a display at least partially surrounded by the housing and operably coupled to the processing unit and a crown assembly. The crown assembly includes a user-rotatable crown body, and a shaft mechanically coupled to the user-rotatable crown body and electrically coupled to the processing unit, and extending through the opening in the housing. The crown assembly further includes a conductive cap at least partially surrounded by the user-rotatable crown body and mechanically and electrically coupled to the shaft. The electronic watch further includes a sensor configured to detect rotation of the user-rotatable crown body. The processing unit is configured to generate an electrocardiogram of a user in response to detecting a voltage at the conductive cap.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
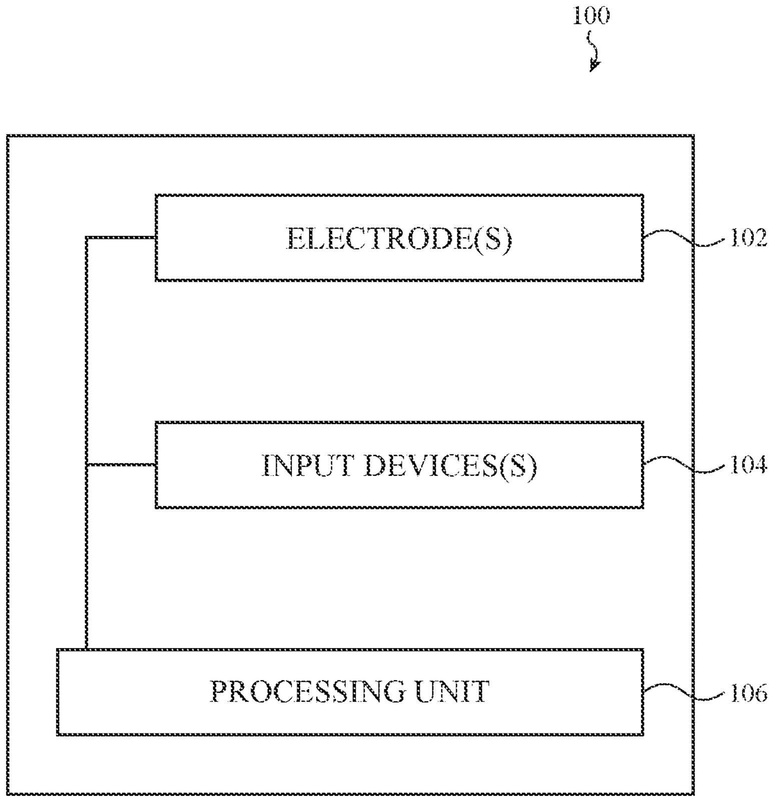
FIG. 1A shows a functional block diagram of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to embodiments and techniques for mechanically and electrically coupling a conductive cap of a crown assembly to a shaft of the crown assembly. In various embodiments, an electronic device such as an electronic watch, includes a crown assembly having a shaft and a user-rotatable crown that may be used to provide rotational and/or translational inputs to the electronic device.

The user-rotatable crown may include one or more conductive components (e.g., a conductive cap) that function as an electrode to sense voltages or signals indicative of one or more biological parameters of a user who is in contact with the conductive cap. The conductive components of the crown may be electrically and mechanically coupled to a conductive rotatable shaft that extends through an opening in a device housing. An end of the shaft interior to the housing, or a conductive shaft retainer interior to the housing, may be in mechanical and electrical contact with a connector (e.g., a spring-biased conductor) that carries electrical signals between the shaft or shaft retainer and a circuit (e.g., a processing unit), thereby providing electrical communication between the crown and the circuit.

In some devices, a conductive cap and the shaft may form a unitary component made of the same material. However, in many cases different material properties are useful and/or desired for the conductive cap than those of the shaft, making desirable a solution in which the conductive cap and the shaft are separate components. As described herein, in various embodiments, the conductive cap is a separate component from the shaft, and may be formed of a different material from the shaft (for example, in embodiments having different needs or features for each such component). As one non-limiting example, the conductive cap may define at least a portion of an exterior surface of the electronic device, so the material for the conductive cap may be selected for its cosmetic appearance in addition to its conductivity and ability to resist corrosion. The shaft may not be externally visible, so the material for the shaft may be selected without regard for its cosmetic appearance, and may instead be selected for other properties such as a combination of strength, conductivity, and ability to resist corrosion.

In various embodiments in which the conductive cap and the shaft are separate components, the conductive cap and the shaft must be mechanically and electrically coupled. As described herein, the conductive cap may be mechanically and/or electrically coupled to the shaft using a mechanical interlock, solder, another attachment mechanism, or some combination thereof. In some embodiments, the same attachment mechanism mechanically and electrically couples the conductive cap to the shaft. In some embodiments, separate attachment mechanisms mechanically and electrically couple the conductive cap to the shaft.

In some embodiments, the user-rotatable crown further includes a crown body that at least partially surrounds the conductive cap. The crown body may be electrically isolated from the conductive cap, for example by an isolating component positioned between the conductive cap and the crown body. In various embodiments, electrically isolating the crown body from the conductive cap may improve the function of the electronic device by reducing signal noise in signals received at the conductive cap, avoiding grounding of the conductive cap with the device housing, and the like. In some embodiments, one or more attachment mechanism(s) may attach the conductive cap to the crown body. In some cases, an attachment mechanism that mechanically and/or electrically couples the conductive cap to the shaft also mechanically couples the conductive cap to the crown body.

In some embodiments, one or more additional electrodes besides the conductive cap may be positioned on the exterior surface of the electronic device. Providing electrodes on different surfaces of a device may make it easier for a user to place different body parts in contact with different electrodes. In some embodiments, for example, the conductive cap is operable to be contacted by a finger of a user of the electronic device while another electrode is positioned against skin of the user. For example, a user may place one or more of the additional electrodes in contact with their wrist, and may touch the conductive cap (or another electrode) with a finger of their opposite hand (e.g., an electronic watch may be attached to a wrist adjacent one hand, and the crown may be touched with a finger of the opposite hand).

The conductive cap and/or the additional electrode(s) may sense voltages or signals indicative of one or more biological parameters of a user who is in contact with the conductive cap and/or the additional electrode(s). As discussed above, the shaft may electrically couple the conductive cap to a processing unit or other circuit of the electronic device. One or more electrically transmissive elements may couple the additional electrode(s) to the processing unit 106 or other circuit of the electronic device.

The processing unit of the electronic device, or a processing unit remote from the electronic device, may determine, from the voltages or signals at the electrodes (e.g., from stored digital samples or values representing the voltages or signals), the biological parameter(s) of the user. The biological parameter(s) may include, for example, an electrocardiogram (ECG) for the user, an indication of whether the user is experiencing atrial fibrillation, an indication of whether the user is experiencing premature atrial contraction or premature ventricular contraction, an indication of whether the user is experiencing a sinus arrhythmia, and so on.

These and other embodiments are discussed with reference to FIGS. 1-8. However, those skilled in the art will readily appreciate that the detailed description given herein with respect to these figures is for explanatory purposes only and should not be construed as limiting.

FIG. 1A shows a functional block diagram of an electronic device 100. In some examples, the device 100 may be an electronic watch or electronic health monitoring device. The electronic device 100 may include one or more input devices 102, one or more output devices 104, and a processing unit 106. Broadly, the input devices 102 may detect various types of input, and the output devices 104 may provide various types of output. The processing unit 106 may receive input signals from the input devices 102, in response to inputs detected by the input devices. The processing unit 106 may interpret input signals received from one or more of the input devices 102 and transmit output signals to one or more of the output devices 104. The output signals may cause the output devices 104 to provide one or more outputs. Detected input at one or more of the input devices 102 may be used to control one or more functions of the device 100. In some cases, one or more of the output devices 104 may be configured to provide outputs that are dependent on, or manipulated in response to, the input detected by one or more of the input devices 102. The outputs provided by one or more of the output devices 104 may also be responsive to, or initiated by, a program or application executed by the processing unit 106 and/or an associated companion device.

In various embodiments, the input devices 102 may include any suitable components for detecting inputs. Examples of input devices 102 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 102 may be configured to detect one or more particular types of input and provide a signal (e.g., an input signal) corresponding to the detected input. The signal may be provided, for example, to the processing unit 106.

The output devices 104 may include any suitable components for providing outputs. Examples of output devices 104 include audio output devices (e.g., speakers), visual output devices (e.g., lights or displays), tactile output devices (e.g., haptic output devices), communication devices (e.g., wired or wireless communication devices), and so on, or some combination thereof. Each output device 104 may be configured to receive one or more signals (e.g., an output signal provided by the processing unit 106) and provide an output corresponding to the signal.

The processing unit 106 may be operably coupled to the input devices 102 and the output devices 104. The processing unit 106 may be adapted to exchange signals with the input devices 102 and the output devices 104. For example, the processing unit 106 may receive an input signal from an input device 102 that corresponds to an input detected by the input device 102. The processing unit 106 may interpret the received input signal to determine whether to provide and/or change one or more outputs in response to the input signal. The processing unit 106 may then send an output signal to one or more of the output devices 104, to provide and/or change outputs as appropriate. Examples of suitable processing units are discussed in more detail below with respect to FIG. 10.

In some examples, the input devices 102 may include a set of one or more electrodes. The electrodes may be disposed on one or more exterior surfaces of the device 100. The processing unit 106 may monitor for voltages or signals received on at least one of the electrodes. In some embodiments, one of the electrodes may be permanently or switchably coupled to a device ground. The electrodes may be used to provide an ECG function for the device 100. For example, a 2-lead ECG function may be provided when a user of the device 100 contacts first and second electrodes that receive signals from the user. As another example, a 3-lead ECG function may be provided when a user of the device 100 contacts first and second electrodes that receive signals from the user, and a third electrode that grounds the user to the device 100. In both the 2-lead and 3-lead ECG embodiments, the user may press the first electrode against a first part of their body and press the second electrode against a second part of their body. The third electrode may be pressed against the first or second body part, depending on where it is located on the device 100.

Figure 1B:
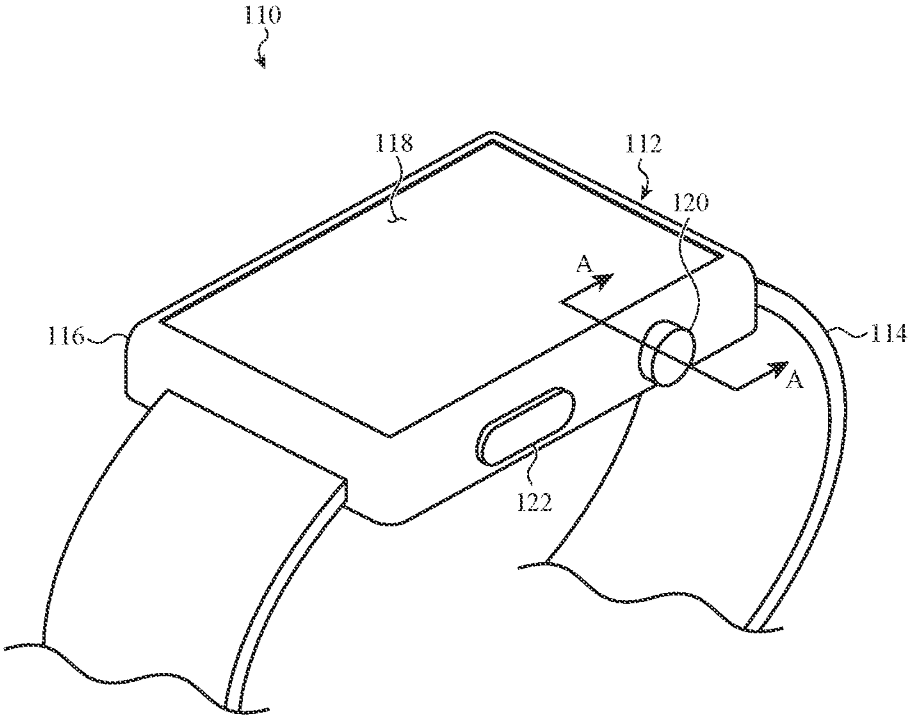
FIG. 1B shows an example of a watch that may incorporate a crown assembly.

FIG. 1B shows an example of a watch 110 (e.g., an electronic watch) that incorporates a crown assembly as described herein. The watch may include a watch body 112 and a watch band 114. Other devices that may incorporate a set of electrodes include other wearable electronic devices, other timekeeping devices, other health monitoring or fitness devices, other portable computing devices, mobile phones (including smart phones), tablet computing devices, digital media players, or the like.

The watch body 112 may include a housing 116. The housing 116 may include a front side housing member that faces away from a user's skin when the watch 110 is worn by a user, and a back side housing member that faces toward the user's skin. Alternatively, the housing 116 may include a singular housing member, or more than two housing members. The one or more housing members may be metallic, plastic, ceramic, glass, or other types of housing members (or combinations of such materials).

A cover sheet 118 may be mounted to a front side of the watch body 112 (i.e., facing away from a user's skin) and may protect a display mounted within the housing 116. The display may be viewable by a user through the cover sheet 118. In some cases, the cover sheet 118 may be part of a display stack, which display stack may include a touch sensing or force sensing capability. The display may be configured to depict a graphical output of the watch 110, and a user may interact with the graphical output (e.g., using a finger or stylus). As one example, the user may select (or otherwise interact with) a graphic, icon, or the like presented on the display by touching or pressing (e.g., providing touch input) on the display at the location of the graphic. As used herein, the term "cover sheet" may be used to refer to any transparent, semi-transparent, or translucent surface made out of glass, a crystalline material (such as sapphire or zirconia), plastic, or the like. Thus, it should be appreciated that the term "cover sheet," as used herein, encompasses amorphous solids as well as crystalline solids. The cover sheet 118 may form a part of the housing 116. In some examples, the cover sheet 118 may be a sapphire cover sheet. The cover sheet 118 may also be formed of glass, plastic, or other materials.

In some embodiments, the watch body 112 may include an additional cover sheet (not shown) that forms a part of the housing 116. The additional cover sheet may have one or more electrodes thereon.

The watch body 112 may include at least one input device or selection device, such as a crown assembly, scroll wheel, knob, dial, button, or the like, which input device may be operated by a user of the watch 110. In some embodiments, the watch 110 includes a crown assembly that includes a crown 120 and a shaft (not shown in FIG. 1B). For example, the housing 116 may define an opening through which the shaft extends. The crown 120 may be attached to the shaft, and may be accessible to a user exterior to the housing 116. The crown 120 may be user-rotatable, and may be manipulated (e.g., rotated) by a user to rotate or translate the shaft. The shaft may be mechanically, electrically, magnetically, and/or optically coupled to components within the housing 116 as one example. A user's manipulation of the crown 120 and shaft may be used, in turn, to manipulate or select various elements displayed on the display, to adjust a volume of a speaker, to turn the watch 110 on or off, and so on. The housing 116 may also include an opening through which a button 122 protrudes. In some embodiments, the crown 120, scroll wheel, knob, dial, button 122, or the like may be conductive, or have a conductive surface, and a signal route may be provided between the conductive portion of the crown 120, scroll wheel, knob, dial, button 122, or the like and a circuit within the watch body 112. In some embodiments, the crown 120 may be part of a crown assembly as described with reference to FIGS. 2-4.

The housing 116 may include structures for attaching the watch band 114 to the watch body 112. In some cases, the structures may include elongate recesses or openings through which ends of the watch band 114 may be inserted and attached to the watch body 112. In other cases (not shown), the structures may include indents (e.g., dimples or depressions) in the housing 116, which indents may receive ends of spring pins that are attached to or threaded through ends of a watch band to attach the watch band to the watch body. The watch band 114 may be used to secure the watch 110 to a user, another device, a retaining mechanism, and so on.

In some examples, the watch 110 may lack any or all of the cover sheet 118, the display, the crown 120, or the button 122. For example, the watch 110 may include an audio input or output interface, a touch input interface, a force input or haptic output interface, or other input or output interface that does not require the display, crown 120, or button 122. The watch 110 may also include the afore-mentioned input or output interfaces in addition to the display, crown 120, or button 122. When the watch 110 lacks the display, the front side of the watch 110 may be covered by the cover sheet 118, or by a metallic or other type of housing member.

Figure 2:
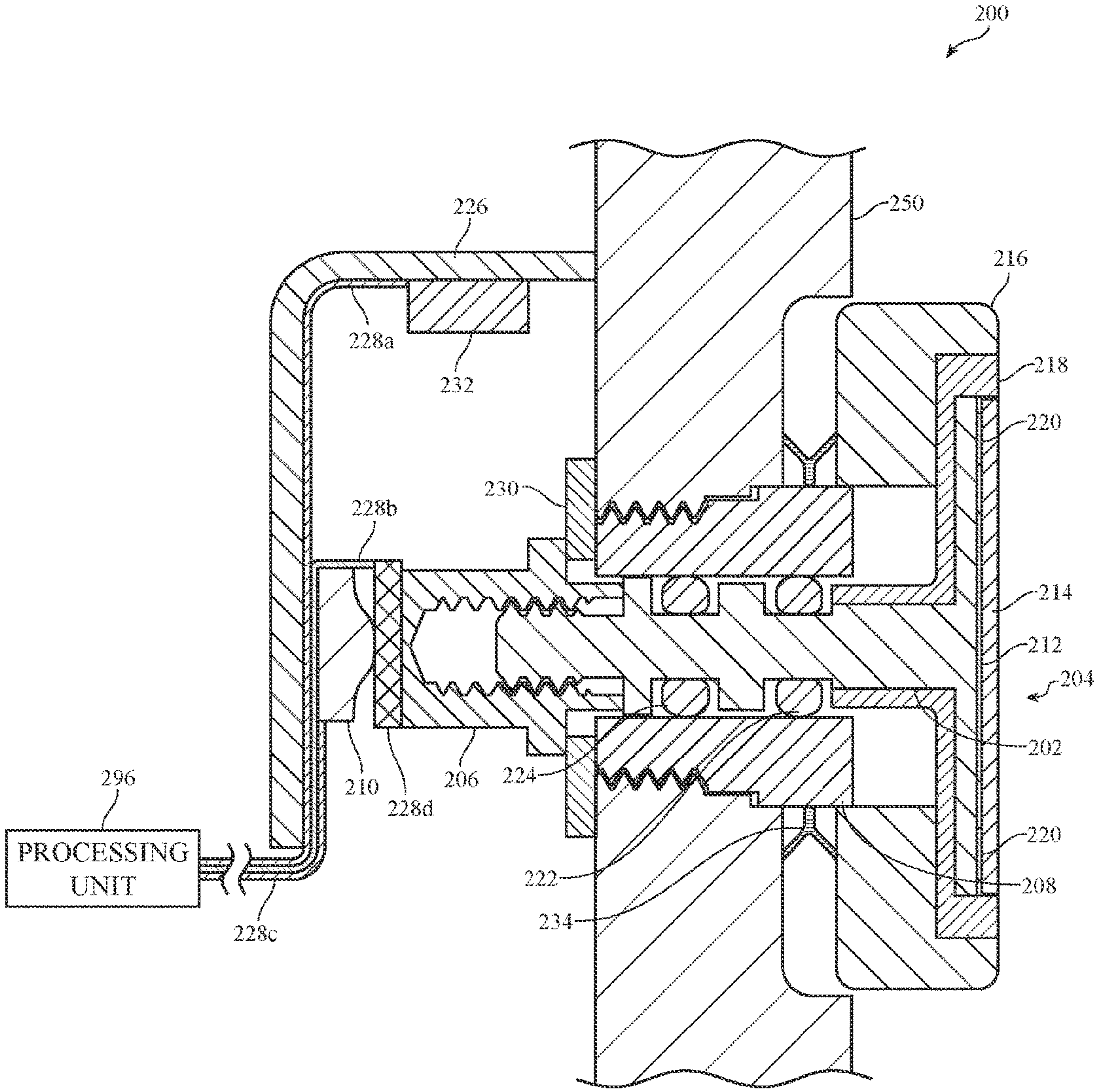
FIG. 2 shows a cross-section view of an example of a crown assembly, taken through section line A-A of FIG. 1B.

Turning now to FIG. 2, there is shown an example of a crown assembly 200, taken through section line A-A of FIG. 1B. FIG. 2 shows an assembled cross-section of a crown assembly 200, as viewed from the front or rear face of a watch body. The crown assembly 200 may include a conductive rotatable shaft 202 configured to extend through an opening in a housing 250, such as the housing described with reference to FIG. 1B. A user-rotatable crown 204 may be mechanically and/or electrically coupled to the shaft 202 exterior to the housing 250. The crown 204 may be rotated by a user of an electronic watch, to in turn rotate the shaft 202. As used herein, "mechanically coupled" includes direct attachment and indirect connection using one or more additional components, and "electrically coupled" includes direct conductive connection and indirect conductive connection using one or more additional components. In some cases, the crown 204 may also be pulled or pushed by the user to translate the shaft 202 along its axis (e.g., left and right with respect to FIG. 2). The crown 204 may be electrically coupled to a circuit within the housing 250 (e.g., a processing unit 296), but electrically isolated from the housing 250.

In some cases, the crown 204 includes a conductive cap 214 at least partially surrounded by a crown body 216. In some cases, the conductive cap 214 is electrically and mechanically coupled to the shaft 202. The conductive cap 214 may function as an electrode as discussed above with respect to FIGS. 1A-1B. The conductive cap 214 may be formed of any suitable conductive material or combination of materials, including titanium, steel, brass, ceramic, doped materials (e.g., plastics). In various embodiments, it is advantageous for the conductive cap 214 to resist corrosion, so material(s) may be selected that are resistant to corrosion, such as titanium. In some embodiments, one or more attachment mechanism(s) may mechanically couple the conductive cap to the crown body. In some cases, an attachment mechanism that mechanically and/or electrically couples the conductive cap to the shaft also mechanically couples the conductive cap to the crown body.

As discussed above, in some cases, the conductive cap 214 is electrically and mechanically coupled to the shaft 202. In various embodiments, one or more attachment components 212 mechanically and/or electrically couple the conductive cap 214 and the shaft 202. The attachment component 212 may include one or more fasteners, mechanical interlocks, adhesives, or some combination thereof. In some embodiments, multiple components mechanically and/or electrically couple the conductive cap 214 and the shaft 202. For example, the crown 204 may include a component 220 disposed between the conductive cap 214 and the shaft 202. The component 220 may at least partially surround the attachment component 212. The component 220 may include one or more fasteners, adhesives, or the like to mechanically couple the conductive cap 214 and the shaft 202 and/or a conductive material for electrically coupling the conductive cap 214 and the shaft 202.

In various embodiments, the component 220 may include additional or alternative functionality and structure. For example, the component 220 may serve as a standoff or spacer between the conductive cap 214 and the shaft 202. Additionally or alternatively, the component 220 may prevent the ingress of contaminants and other substances into the space between the conductive cap 214 and the shaft 202. For example, the component 220 may include one or more adhesives (e.g., liquid glue, heat-activated film, pressure-sensitive adhesive) or other substances (e.g., oil) for forming a barrier to exclude contaminants.

In various embodiments, an isolating component 218 may electrically isolate the conductive cap 214 from the crown body 216. The isolating component 218 may help prevent shorting of the crown 204 to the housing 250 and/or the crown body 216. The crown body 216 may be formed of any suitable material, including conductive and non-conductive materials (e.g., aluminum, stainless steel, or the like). In some embodiments, one or more components of the crown 204 may have a conductive surface covered by a thin non-conductive coating. The non-conductive coating may provide a dielectric for capacitive coupling between the conductive surface and a finger of a user of the crown 204 (or an electronic watch or other device that includes the crown assembly 200). In the same or different embodiments, the crown 204 may have a non-conductive coating on a surface of the crown 204 facing the housing 250. In some examples, the conductive material(s) may include a PVD deposited layer of aluminum titanium nitride (AlTiN) or chromium silicon carbonitride (CrSiCN).

In some embodiments, the crown body 216 is conductive and functions as an electrode. For example, the conductive cap 214 may be a first electrode and the crown body 216 may be a second electrode for use in an ECG (e.g., a 2-lead ECG). In some embodiments, the conductive cap 214 and the crown body 216 may be the only electrodes on the watch 110. In some embodiments, there may be one or more additional electrodes in addition to the conductive cap 214 and the crown body 216. For example, the crown body 216 (or the conductive cap 214) may function as an electrode (e.g., a third electrode in a 3-lead ECG) that grounds the user to the watch 110.

In various embodiments, the shaft 202 may be mechanically and/or electrically coupled to one or more additional components of the crown 204, including the conductive cap 214 and/or the crown body 216. The shaft 202 may be mechanically coupled to the crown 204 using a mechanical interlock, adhesives, fasteners, or some combination thereof. In some embodiments, the isolating component 218 mechanically couples the shaft 202 with the crown body 216. For example, as shown and described below with respect to FIG. 4, the isolating component 218 may form a mechanical interlock between the shaft 202 and the crown body 216. The isolating component 218 may be formed of any suitable electrically isolating or other non-conductive material, such as plastic. In some embodiments, the isolating component 218 may be insert molded between the shaft 202 and the crown body 216.

Figure 3A:
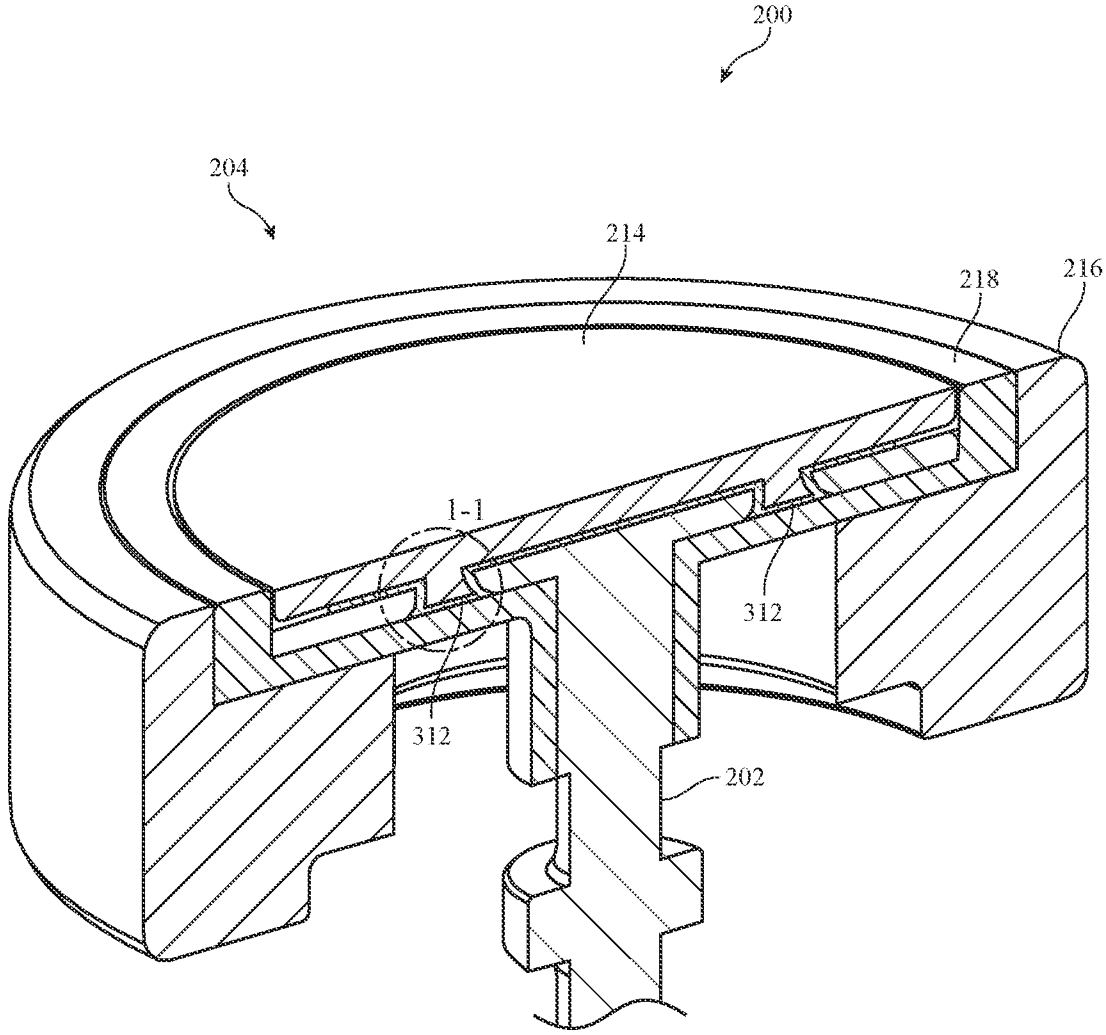
FIG. 3A shows a cross-section view of an example embodiment of a crown assembly.

FIG. 3A shows a cross-section view of an example embodiment of the crown assembly 200. As discussed above with respect to FIG. 2, the crown assembly 200 includes a crown 204 and a shaft 202. The conductive cap 214 of the crown 204 is mechanically and electrically coupled to the shaft 202 by attachment mechanism 312. As shown in FIG. 3A, the conductive cap 214 may form a first portion of an exterior surface of the crown 204, the crown body 216 may form a second portion of the exterior surface of the crown 204, and the isolating component may form a third portion of the exterior surface of the user-rotatable crown. In some embodiments, the attachment mechanism 312 is a solder joint (e.g., formed of solder), but may be any suitable conductive material, including conductive adhesives or the like.

The attachment mechanism 312 may be formed of any suitable conductive material, and may mechanically and electrically couple the conductive cap 214 and the shaft 202. The attachment mechanism 312 may electrically couple the conductive cap 214 and the shaft 202 by contacting both the conductive cap 214 and the shaft 202 to form a signal path between the two components. This allows the watch 110 to measure a biological parameter such as an ECG by coupling to a user's finger.

Figure 3B:
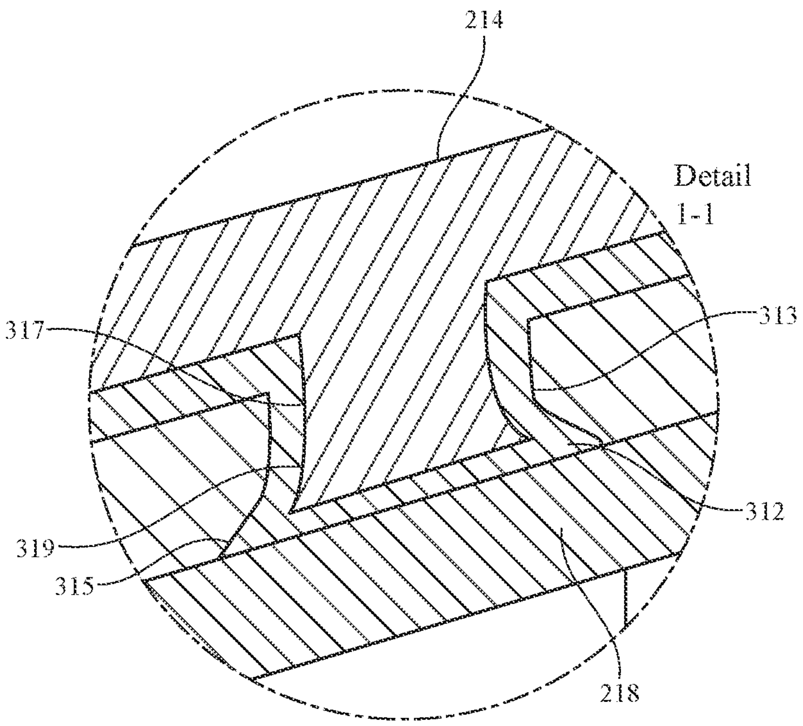
FIG. 3B shows a detailed view of area 1-1 shown in FIG. 3A.

In some embodiments, the attachment mechanism 312 mechanically couples the conductive cap 214 and the shaft 202 by forming (or functioning as) a mechanical bond between the two components. In some embodiments, the shaft 202 and/or the conductive cap 214 include one or more features (e.g., openings, orifices, protrusions, threads, teeth, or the like) to facilitate mechanical and/or electrical coupling. For example, the conductive cap 214 may include one or more protrusions and the shaft 202 may include one or more orifices. FIG. 3B shows a detailed view of area 1-1 shown in FIG. 3A. As shown in FIG. 3B, the shaft 202 includes an orifice 313 and the conductive cap 214 includes a protrusion 317 to facilitate mechanical and/or electrical coupling of the conductive cap 214 and the shaft 202. In some embodiments, the protrusion 317 may be positioned at least partially within the orifice 313, and the attachment mechanism 312 (e.g., the solder joint) may be positioned between the conductive cap 214 and the shaft 202 to mechanically and/or electrically couple the conductive cap 214 and the shaft 202. In some embodiments, the attachment mechanism 312 is not a separate material or component, and the conductive cap 214 and the shaft 202 are mechanically and/or electrically coupled directly, for example using a press fit or molding process. In some embodiments, the orifice 313 may be a through hole. In some embodiments, the orifice 313 may be a blind hole.

In some cases, the attachment mechanism includes a mechanical interlock. For example, the protrusion, the orifice, and/or the solder may cooperate to form a mechanical interlock (e.g., a mechanical coupling) between the conductive cap 214 and the shaft 202. In some embodiments, the orifice 313 includes an undercut region 315, another indentation, or another feature to facilitate a mechanical interlock between the conductive cap 214 and the shaft 202. Similarly, in some embodiments, the protrusion 317 may include an interlock feature 319 to facilitate a mechanical interlock between the conductive cap 214 and the shaft 202. Example interlock features include a flare, a skirt, and the like. For example, as shown in FIG. 3B, the undercut region 315 and the interlock feature 319 create a stronger mechanical coupling by creating a mechanical interlock between the conductive cap 214 and the shaft 202. In some embodiments, the interlock feature extends all the way around the protrusion. In some embodiments, the interlock feature include one or more features positioned at different locations around the protrusion. In some embodiments, the undercut region 315 and/or the interlock feature 319 may be shaped differently than the embodiment of FIG. 3B. For example, the interlock feature 319 may form a T-shape, and the undercut region 315 may form a corresponding T-shape configured to receive the interlock feature 319. In some embodiments, the shaft 202 may include one or more protrusions and the conductive cap 214 may include one or more orifices configured to receive the protrusion(s).

As discussed above, in one embodiment, the attachment mechanism 312 is a solder joint. The solder may be disposed on the protrusion 317 such that when the protrusion 317 is positioned within the orifice 313 and the solder is heated, the solder melts to occupy the space(s) between the conductive cap 214 and the shaft 202 to mechanically and/or electrically couple the two components. As shown in FIG. 3B, in some embodiments, the attachment mechanism 312 (e.g., the solder joint) is disposed at least partially within the orifice 313. In various embodiments the isolating component 218 may thermally insulate the crown body 216 as the solder is heated to avoid damage to the crown body 216, such as cracking. Additionally or alternatively, the shaft 202 may act as a heat sink to cool the solder to avoid damage to the crown body 216.

Figure 3C:
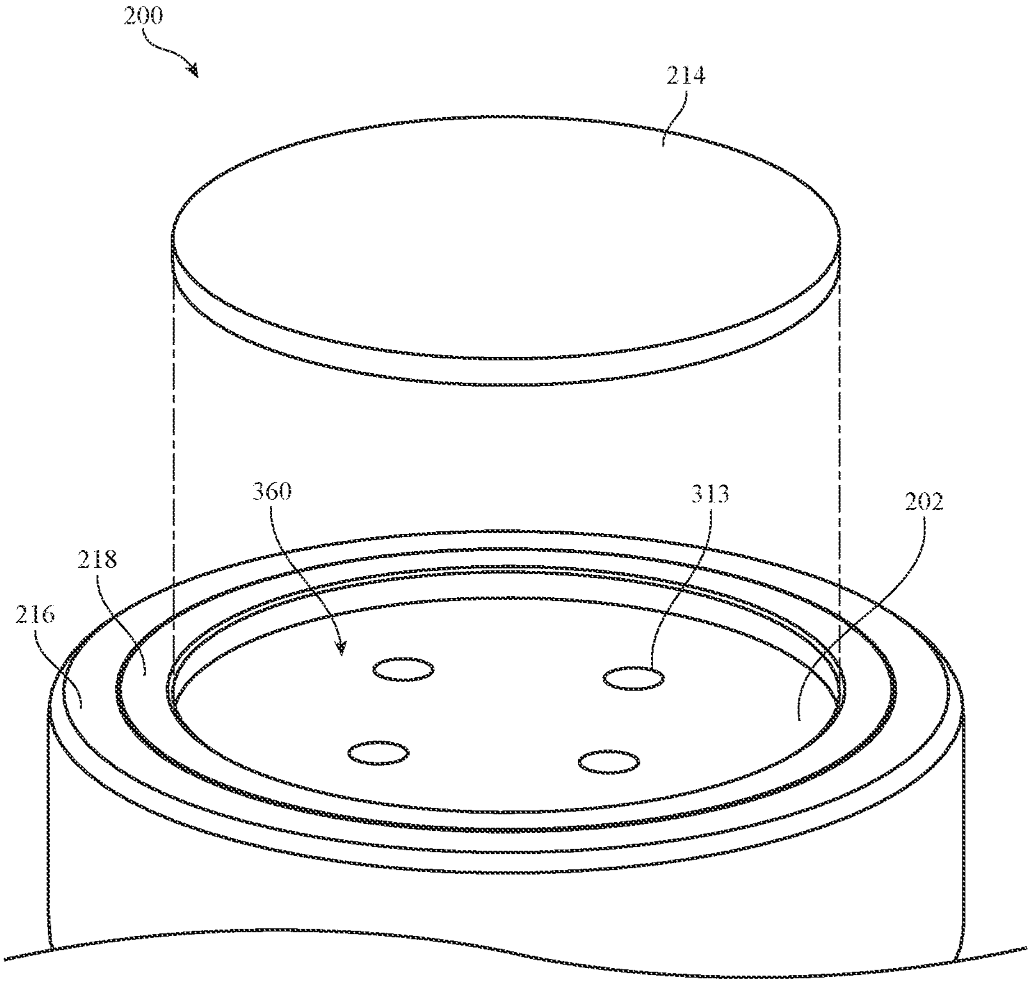
FIG. 3C shows a partial view of the example crown assembly of FIG. 3A with the conductive cap removed.

In various embodiments, the conductive cap 214 may include multiple protrusions 317. Similarly, the shaft 202 may include multiple orifices 313. The protrusions 317 and the orifices 313 may be arranged such that each protrusion 317 may be positioned at least partially within an orifice 313. FIG. 3C shows a partial view of the example crown assembly 200 with the conductive cap 214 removed. As shown in FIG. 3C, the shaft 202 may include four orifices

Figure 3D:
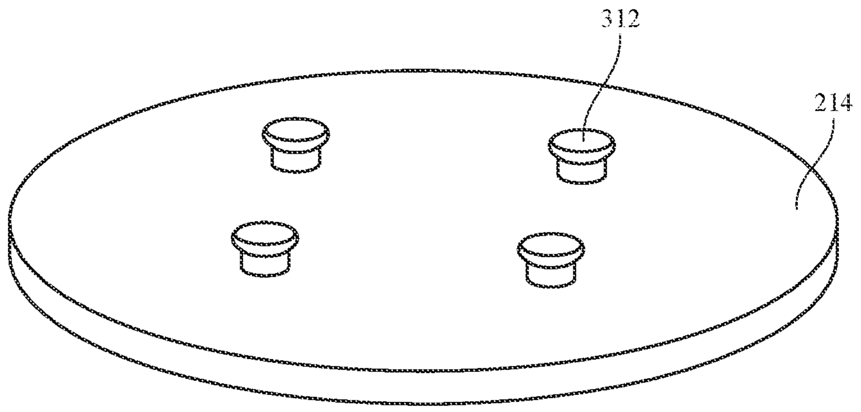
FIG. 3D shows a bottom view of the conductive cap of FIG. 3A.

313 arranged in a square or rectangular pattern. FIG. 3D shows a bottom view of the conductive cap 214. As shown in FIG. 3D, the conductive cap 214 may include four protrusions 317 arranged in a similar pattern as the orifices 313 shown in FIG. 3C. As described above, a solder joint or another attachment mechanism may be positioned on the protrusions 317, within the orifices 313, or some combination thereof to facilitate mechanical and/or electrical coupling of the conductive cap 214 and the shaft 202.

In the examples shown in FIGS. 3C and 3D, four orifices 313 and four protrusions 317 are shown for illustrative purposes. In various embodiments, any number of orifices or protrusions may be included.

As shown in FIG. 3C, the crown body 216 and/or the shaft 202 may define a cavity 360. The conductive cap 214, the isolating component 218, and/or one or more additional components of the crown assembly 200 may be disposed in the cavity and at least partially surrounded by the crown body 216. In some embodiments, the isolating component 218 is at least partially disposed in the cavity 360 around a periphery of the conductive cap 214. In some embodiments, the crown body 216 defines a through hole and the shaft extends at least partially through the through hole, and the shaft 202 may cooperate with the crown body 216 to define the cavity 360.

Figure 4:
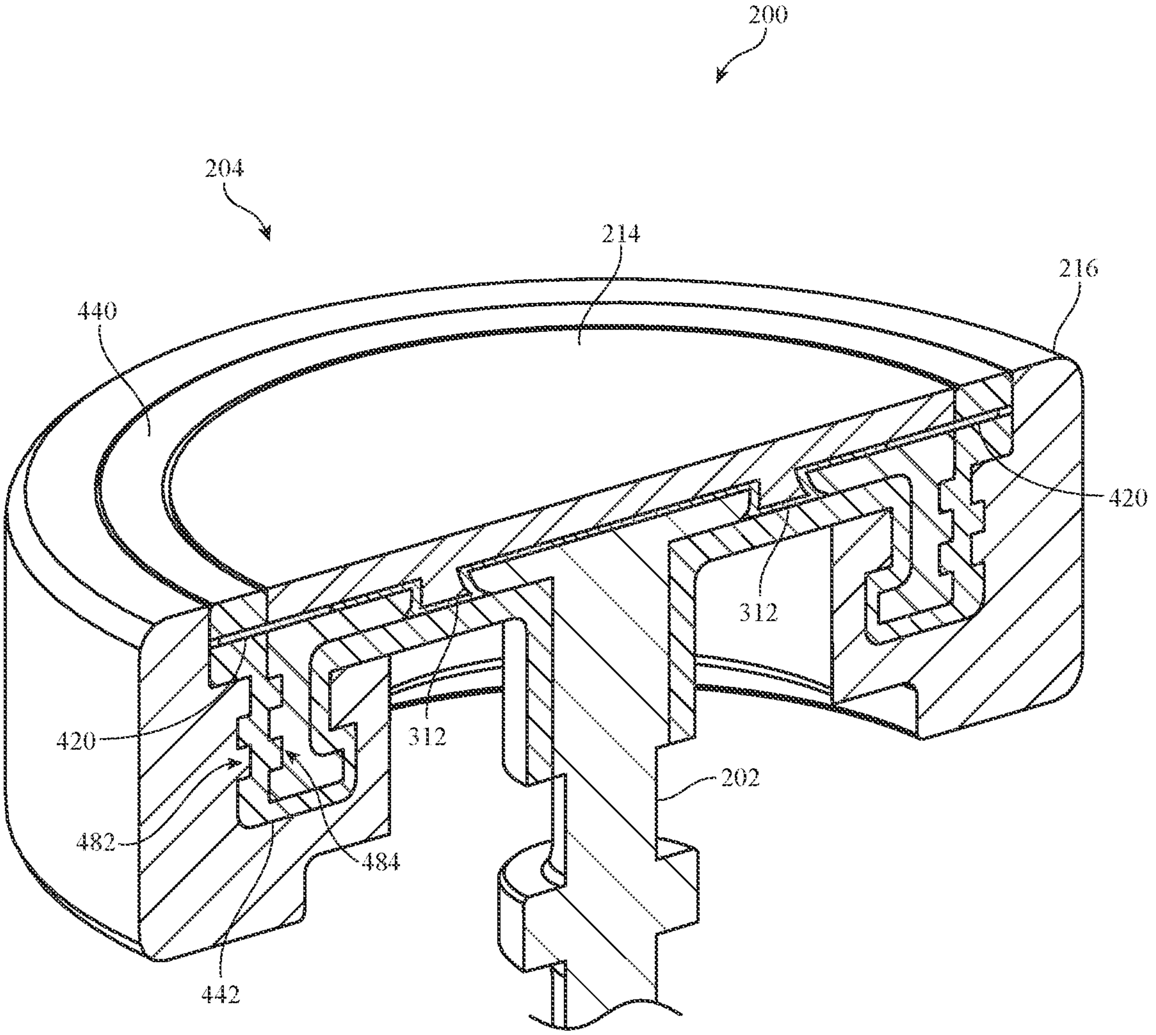
FIG. 4 shows a cross-section view of an example embodiment of a crown assembly.

As discussed above with respect to FIGS. 3A-3B, the isolating component 218 may electrically isolate the conductive cap 214 from the crown body 216 and it may thermally insulate the crown body 216 as the attachment mechanism 312 or another component of the crown assembly is heated. As shown in FIG. 3A, the isolating component 218 may also define a portion of an exterior surface of the crown assembly 200. In various embodiments, it may be advantageous to include a separate component that defines the portion of the exterior surface of the crown assembly 200. For example certain materials may offer better thermal and/or electrical isolation, but lack cosmetic features required for an exterior component. FIG. 4 shows an example cross-section view of an embodiment of the crown assembly 200 that includes an external isolating component 440 that defines a portion of the exterior surface of the crown assembly 200 and/or electrically isolates the conductive cap 214 and the crown body 216. FIG. 4 also shows an internal isolating component 442 positioned between the shaft 202 and the crown body 216.

The internal isolating component 442 may be substantially similar to the isolating component 218 as discussed above, and may include similar materials and installation techniques. The external isolating component 440 may include similar materials as discussed above with respect to the isolating component 218. It may be insert molded similar to the isolating component 218 or it may be placed within the crown body and otherwise attached to the crown assembly 200. For example, the crown assembly 200 may include a component 420, similar to the component 220 discussed above with respect to FIG. 2. The component 420 may include an adhesive or other fastener configured to mechanically couple the external isolating component 440 to the internal isolating component 442, the shaft 202, and/or another component of the crown assembly 200.

As shown in FIG. 3A, a gap between the conductive cap 214 and the shaft 202 may expose the attachment mechanism 312 to an exterior environment and/or contaminants from an exterior environment. For example, solder may be corroded or otherwise damaged by contaminants or other substances contacting it. Returning to FIG. 4, in various embodiments, in addition to or in the component 420 may form a seal to prevent the ingress of contaminants. For example, the component 420 may include a gasket disposed around a top surface of the shaft 202. Additionally or alternatively, the component 420 may serve a variety of functions, including acting as a spacer or standoff, electrically isolating components of the crown assembly 200, electrically coupling components of the crown assembly, or the like.

As discussed above, in some embodiments, the external isolating component 440 and the internal isolating component 442 are combined as a single component. In various embodiments, the external isolating component 440, the internal isolating component 442, and/or a combined isolating component may form a mechanical interlock between any or all of the isolating component, the shaft 202, and one or more components of the crown 204. For example, as shown in FIG. 4, the crown body 216 may cooperate with the internal isolating component 442 to form a mechanical interlock 482. The shaft 202 may cooperate with the internal isolating component 442 to form a mechanical interlock 484. The crown body 216, the internal isolating component 442, and the shaft 202 may cooperate to form a mechanical interlock (e.g., a combination of mechanical interlocks 482, 484). In some embodiments, the isolating component 218 may be insert molded between the shaft 202 and the crown body 216 In some embodiments, the shaft is directly mechanically coupled to the crown body 216, for example, using a mechanical interlock, adhesives, fasteners, or some combination thereof.

In various embodiments, some of the components shown and described with respect to FIGS. 2-4 may be omitted, arranged differently, or otherwise different. For example, in some embodiments, the shaft 202 and the crown body 216 are combined as a single component.

Returning now to FIG. 2, a shaft retainer 206 may be mechanically connected to the shaft 202, interior to the housing 250 (e.g., interior to a watch body housing), after the shaft is inserted through the opening in the housing 250 with the crown 204 positioned exterior to the housing 250. In some cases, the shaft retainer 206 may include a nut, and the shaft 202 may have a threaded male portion that engages a threaded female portion of the nut. In some cases, the shaft retainer 206 may be conductive, or have a conductive coating thereon, and mechanical connection of the shaft retainer 206 to the shaft 202 may form an electrical connection between the shaft retainer 206 and the shaft 202. In an alternative embodiment (not shown), the shaft retainer 206 may be integrally formed with the shaft 202, and the shaft 202 may be inserted through the opening in the housing 250 from inside the housing and then attached to the crown 204 (e.g., the crown 204 may screw onto the shaft 202).

A washer 230 may be positioned between the shaft retainer 206 and the housing 250 or another component of the electronic device. For example, a non-conductive (e.g., plastic) washer, plate, or shim may be mechanically coupled to the interior of the housing 250, between the shaft retainer 206 and the housing 250. The washer 230 may provide a bearing surface for the shaft retainer 206.

In some embodiments, a collar 208 may be aligned with the opening in the housing 250. In some embodiments, the collar 208 be coupled to the housing 250 or another component internal to the housing (not shown) via threads on a male portion of the collar 208 and corresponding threads on a female portion of the housing 250. Optionally, a gasket made of a synthetic rubber and fluoropolymer elastomer (e.g., Viton), silicone, or another compressible material may be disposed between the collar 208 and the housing 250 to provide stability to the collar 208 and/or provide a moisture barrier between the collar 208 and the housing 250. Another gasket 234 (e.g., a Y-ring) made of Viton, silicone, or another compressible material may be placed over the collar 208, before or after insertion of the collar 208 through the opening, but before the shaft 202 is inserted through the collar 208. The second gasket 234 may provide a moisture barrier between the crown 204 and the housing 150 and/or the crown 204 and the collar 208.

As shown in FIG. 2, one or more O-rings 222, 224 or other gaskets may be placed over the shaft 202 before the shaft 202 is inserted into the collar 208. The O-rings 222, 224 may be formed of a synthetic rubber and fluoropolymer elastomer, silicone, or another compressible material. In some cases, the O-rings 222, 224 may provide a seal between the shaft 202 and the collar 208. The O-rings 222, 224 may also function as an insulator between the shaft 202 and the collar 208. In some embodiments, the O-rings 222, 224 may be fitted to recesses in the shaft 202.

In some embodiments, a rotation sensor 232 for detecting rotation of the crown 204 and/or the shaft 202 is disposed within the housing 250. The rotation sensor 232 may include one or more light emitters and/or light detectors. The light emitter(s) may illuminate an encoder pattern or other rotating portion of the shaft 202 or shaft retainer 206. The encoder pattern may be carried on (e.g., formed on, printed on, etc.) the shaft 202 or the shaft retainer 206. The light detector(s) may receive reflections of the light emitted by the light emitter(s), and the processing unit 296 may determine a direction of rotation, speed of rotation, angular position, translation, or other state(s) of the crown 204 and shaft 202. In some embodiments, the rotation sensor 232 may detect rotation of the crown 204 by detecting rotation of the shaft 202. The rotation sensor 232 may be electrically coupled to the processing unit 296 of the electronic device by a connector 228*a*.

In some embodiments, a translation sensor 210 for detecting translation of the crown 204 and/or the shaft 202 is disposed within the housing 250. In some embodiments, the translation sensor 210 includes an electrical switch, such as a tactile dome switch, which may be actuated or change state in response to translation of the shaft 202. Thus, when a user presses on the crown 204, the shaft 202 may translate into the housing 250 (e.g., into the housing of a watch body) and actuate the switch, placing the switch in one of a number of states. When the user releases pressure on the crown 204 or pulls the crown 204 outward from the housing 250, the switch may retain the state in which it was placed when pressed, or advance to another state, or toggle between two states, depending on the type or configuration of the switch.

In some embodiments, the translation sensor 210 includes one or more light emitters and/or light detectors. The light emitter(s) may illuminate an encoder pattern or other portion of the shaft 202 or shaft retainer 206. The light detector(s) may receive reflections of the light emitted by the light emitter(s), and a processing unit 296 may determine a direction of rotation, speed of rotation, angular position, translation, or other state(s) of the crown 204 and shaft 202. In some embodiments, the rotation sensor 232 may detect translation of the crown 204 by detecting rotation of the shaft 202. The translation sensor 210 may be electrically coupled to a processing unit 296 of the electronic device by a connector 228*c*.

In various embodiments, the shaft 202 and the conductive cap 214 are in electrical communication with a processing unit 296 and/or one or more other circuits of an electronic device. One or more connectors may electrically couple the shaft 202 to the processing unit 296 and/or one or more other circuits. In some cases, the shaft retainer 206 is conductive and cooperates with one or more connectors to couple the shaft 202 to the processing unit 296 and/or one or more other circuits. In various cases, a connector 228*d* is in mechanical and electrical contact with the shaft retainer 206 (or in some cases with the shaft 202, such as when the shaft extends through the shaft retainer (not shown)). In some cases, the connector 228*d* may be formed (e.g., stamped or bent) from a piece of metal (e.g., stainless steel). In other cases, the connector 228*d* may take on any of several forms and materials. When the shaft 202 is translatable, translation of the shaft 202 into the housing 250 (e.g., into the housing of a watch body) may cause the connector 228*d* to deform or move. However, the connector 228*d* may have a spring bias or other mechanism which causes the connector 228*d* to maintain electrical contact with the shaft retainer or shaft end, regardless of whether the shaft 202 is in a first position or a second position with reference to translation of the shaft 202.

In some embodiments of the crown assembly 200 shown in FIG. 2, the connector 228*d* may include a conductive brush that is biased to contact a side of the shaft 202 or a side of the shaft retainer 206. The conductive brush may maintain electrical contact with the shaft 202 or shaft retainer 206 through rotation or translation of the shaft 202, and may be electrically connected to the processing unit 296 and/or another circuit such that the shaft remains electrically coupled to the processing unit as the shaft rotates. This allows the crown 204, and in particular the conductive cap 214 and/or the crown body 216, to remain electrically coupled to the processing unit 296 as the crown 204 is manipulated (e.g., rotated and/or translated) by a user, which allows the electrode(s) on the crown 204 to maintain their functionality as the crown 204 is manipulated.

The processing unit 296 or other circuit of the electronic device may be in electrical communication with the crown 204 (e.g., the conductive cap 214) via the connector 228*d*, the shaft retainer 206, and the shaft 202 (or when an end of the shaft 202 protrudes through the shaft retainer 206, the processing unit 296 or other circuit may be in electrical communication with the crown 204 via the connector 228*d* and the shaft 202). In some cases, the connector 228*d* is coupled to the processing unit 296 via an additional connector 228*b* (e.g., a cable, flex, or other conductive member). In some cases, as shown in FIG. 2, the connector 228*d* may be positioned between the shaft retainer 206 and the translation sensor 210. The connector 228*d* may be attached to the shaft retainer 206 and/or the translation sensor 210. In some cases, the connector 228*d* may be connected to the processing unit 296 via the translation sensor 210 and/or the connector 228*c*. In some cases, the connector 228*d* is integrated with the translation sensor 210. For example, the shaft retainer 206 may be electrically coupled to the translation sensor 210 to couple the crown 204 to the processing unit 296.

In some embodiments, a bracket 226 may be attached (e.g., laser welded) to the housing 250 or another element within the housing 250. The rotation sensor 232 and/or the translation sensor 210 may be mechanically coupled to bracket 226, and the bracket 226 may support the rotation sensor 232 and/or the translation sensor 210 within the housing 250. In the embodiment shown in FIG. 2, the rotation sensor 232 and the translation sensor 210 are shown as separate components, but in various embodiments, the rotation sensor 232 and the translation sensor 210 may be combined and/or located in different positions from those shown.

The bracket 226 may support a connector 228*b* (e.g., a spring-biased conductor)

The connectors 228*a-c* may be electrically coupled to the processing unit 296, for example as discussed with respect to FIG. 10 below. The processing unit 296 may determine whether a user is touching the conductive cap 214 of the crown 204, and/or determine a biological parameter of the user based on a signal received from or provided to the user via the conductive cap 214, or determine other parameters based on signals received from or provided to the conductive cap 214. In some cases, the processing unit 296 may operate the crown and electrodes described herein as an electrocardiogram and provide an ECG to a user of a watch including the crown and electrodes.

As discussed above, graphics displayed on the electronic devices herein may be manipulated through inputs provided to the crown. FIGS. 5A-7B generally depict examples of changing a graphical output displayed on an electronic device through inputs provided by force and/or rotational inputs to a crown assembly of the device. This manipulation (e.g., selection, acknowledgement, motion, dismissal, magnification, and so on) of a graphic may result in changes in operation of the electronic device and/or graphical output displayed by the electronic device. Although specific examples are provided and discussed, many operations may be performed by rotating and/or applying force to a crown such as the examples described above. Accordingly, the following discussion is by way of example and not limitation.

Figure 5A:
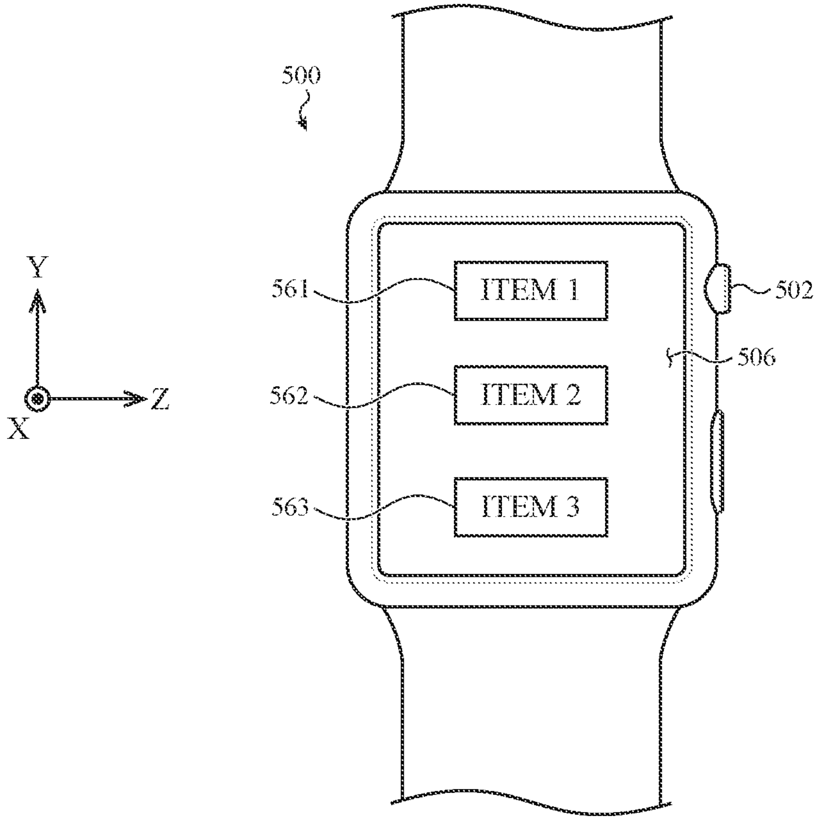
FIGS. 5A-7B generally depict examples of manipulating graphics displayed on an electronic device through inputs provided by force and/or rotational inputs to a crown of the device.

FIG. 5A depicts an example electronic device 500 (shown here as an electronic watch) having a crown 502. The crown 502 may be similar to the examples described above, and may receive force inputs along a first lateral direction, a second lateral direction, or an axial direction of the crown. The crown 502 may also receive rotational inputs. A display 506 provides a graphical output (e.g., shows information and/or other graphics). In some embodiments, the display 506 may be configured as a touch-sensitive display capable of receiving touch and/or force input. In the current example, the display 506 depicts a list of various items 561, 562, 563, all of which are example indicia.

Figure 5B:
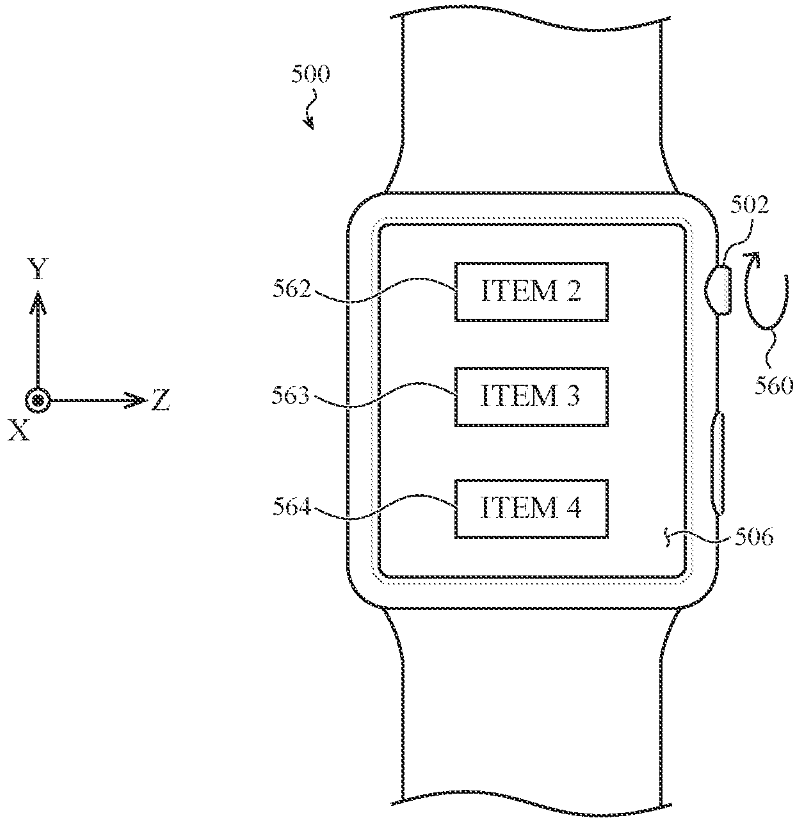

FIG. 5B illustrates how the graphical output shown on the display 506 changes as the crown 502 rotates, partially or completely (as indicated by the arrow 560). Rotating the crown 502 causes the list to scroll or otherwise move on the screen, such that the first item 561 is no longer displayed, the second and third items 562, 563 each move upwards on the display, and a fourth item 564 is now shown at the bottom of the display. This is one example of a scrolling operation that can be executed by rotating the crown 502. Such scrolling operations may provide a simple and efficient way to depict multiple items relatively quickly and in sequential order. A speed of the scrolling operation may be controlled by the amount of rotational force applied to the crown 502 and/or the speed at which the crown 502 is rotated. Faster or more forceful rotation may yield faster scrolling, while slower or less forceful rotation yields slower scrolling. The crown 502 may receive an axial force (e.g., a force inward toward the display 506 or watch body) to select an item from the list, in certain embodiments.

Figure 6A:
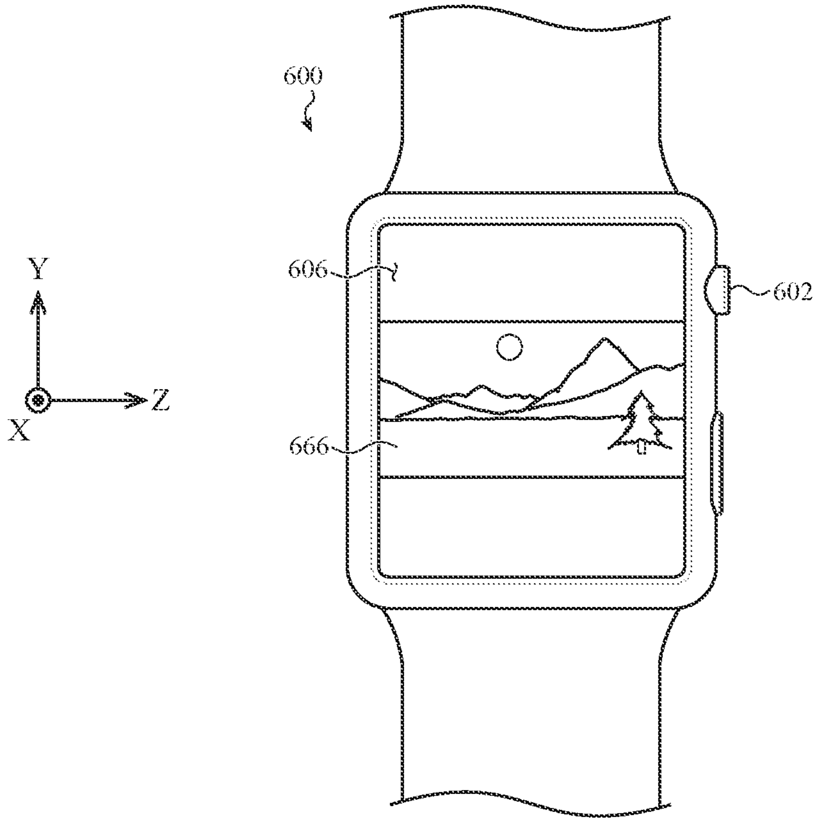
Figure 6B:
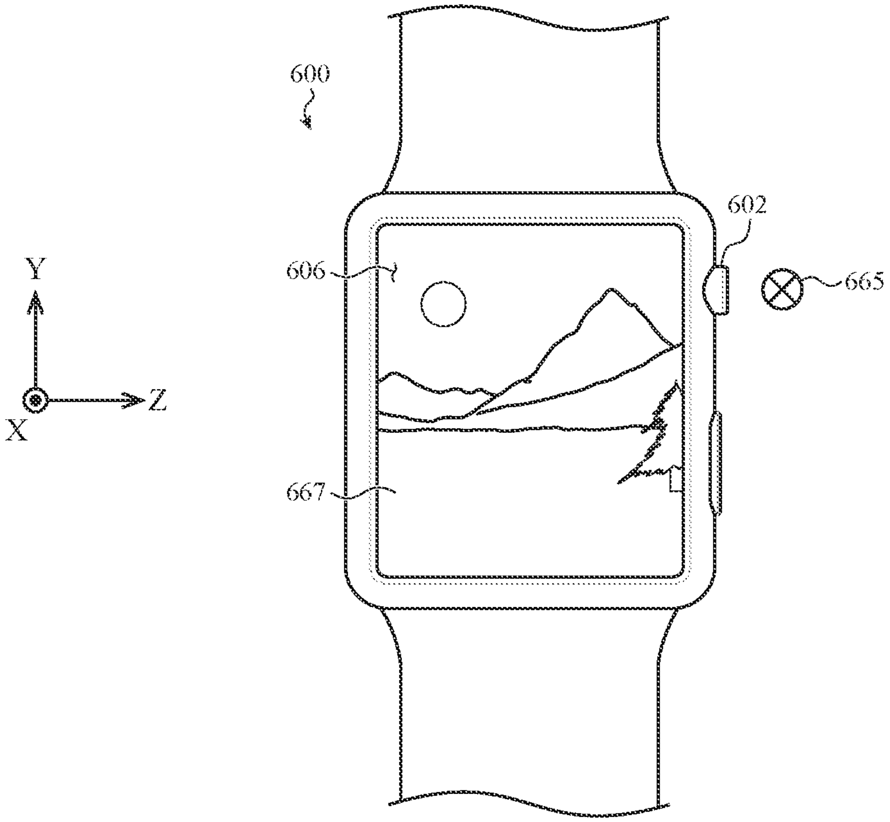

FIGS. 6A and 6B illustrate an example zoom operation. The display 606 depicts a picture 666 at a first magnification, shown in FIG. 6A; the picture 666 is yet another example of an indicium. A user may apply a lateral force (e.g., a force along the x-axis) to the crown 602 of the electronic device 600 (illustrated by arrow 665), and in response the display may zoom into the picture 666, such that a portion 667 of the picture is shown at an increased magnification. This is shown in FIG. 6B. The direction of zoom (in vs. out) and speed of zoom, or location of zoom, may be controlled through force applied to the crown 602, and particularly through the direction of applied force and/or magnitude of applied force. Applying force to the crown 602 in a first direction may zoom in, while applying force to the crown 602 in an opposite direction may zoom out. Alternately, rotating or applying force to the crown 602 in a first direction may change the portion of the picture subject to the zoom effect. In some embodiments, applying an axial force (e.g., a force along the z-axis) to the crown 602 may toggle between different zoom modes or inputs (e.g., direction of zoom vs. portion of picture subject to zoom). In yet other embodiments, applying force to the crown 602 along another direction, such as along the y-axis, may return the picture 666 to the default magnification shown in FIG. 6A.

Figure 7A:
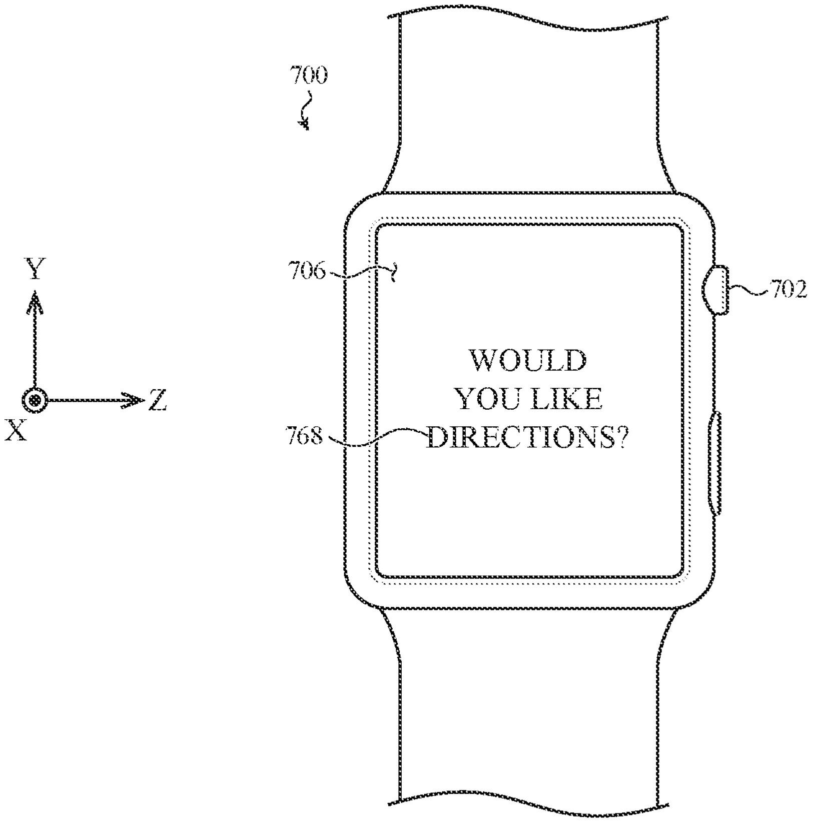
Figure 7B:
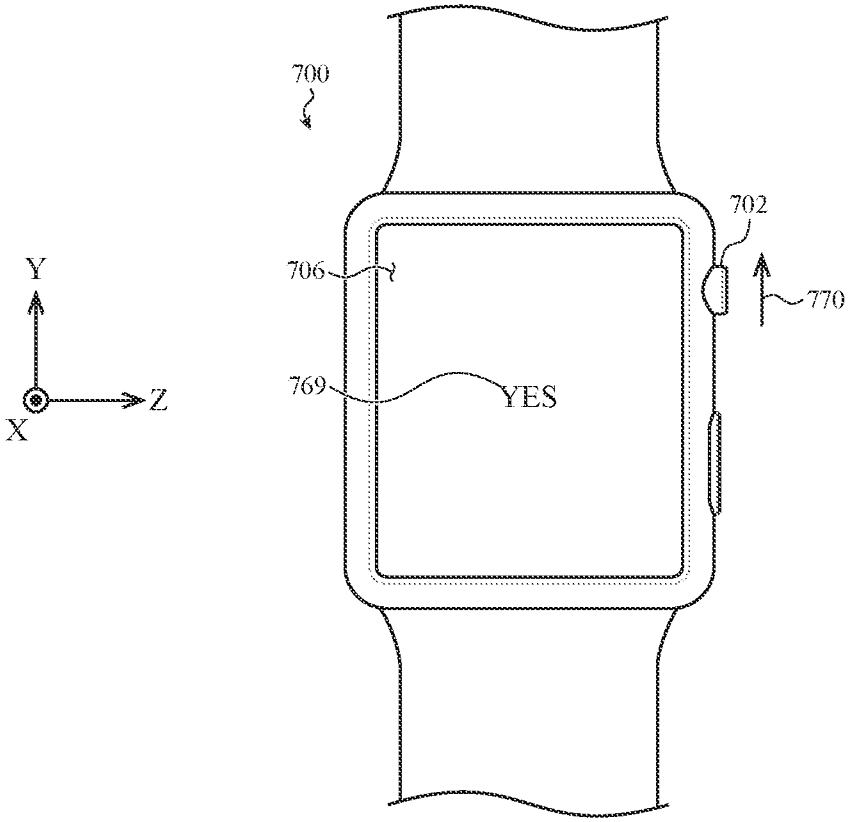

FIGS. 7A and 7B illustrate possible use of the crown 702 to change an operational state of the electronic device 700 or otherwise toggle between inputs. Turning first to FIG. 7A, the display 706 depicts a question 768, namely, “Would you like directions?” As shown in FIG. 7B, a lateral force may be applied to the crown 702 (illustrated by arrow 770) to answer the question. Applying force to the crown 702 provides an input interpreted by the electronic device 700 as “yes,” and so “YES” is displayed as a graphic 769 on the display 706. Applying force to the crown 702 in an opposite direction may provide a “no” input. Both the question 768 and graphic 769 are examples of indicia.

In the embodiment shown in FIGS. 7A and 7B, the force applied to the crown 702 is used to directly provide the input, rather than select from options in a list (as discussed above with respect to FIGS. 5A and 5B).

As mentioned previously, force or rotational input to a crown of an electronic device may control many functions beyond those listed here. The crown may receive distinct force or rotational inputs to adjust a volume of an electronic device, a brightness of a display, or other operational parameters of the device. A force or rotational input applied to the crown may rotate to turn a display on or off, or turn the device on or off. A force or rotational input to the crown may launch or terminate an application on the electronic device. Further, combinations of inputs to the crown may likewise initiate or control any of the foregoing functions, as well.

In some cases, the graphical output of a display may be responsive to inputs applied to a touch-sensitive display (e.g., displays 506, 606, 706, and the like) in addition to inputs applied to a crown. The touch-sensitive display may include or be associated with one or more touch and/or force sensors that extend along an output region of a display and which may use any suitable sensing elements and/or sensing techniques to detect touch and/or force inputs applied to the touch-sensitive display. The same or similar graphical output manipulations that are produced in response to inputs applied to the crown may also be produced in response to inputs applied to the touch-sensitive display. For example, a swipe gesture applied to the touch-sensitive display may cause the graphical output to move in a direction corresponding to the swipe gesture. As another example, a tap gesture applied to the touch-sensitive display may cause an item to be selected or activated. In this way, a user may have multiple different ways to interact with and control an electronic watch, and in particular the graphical output of an electronic watch. Further, while the crown may provide overlapping functionality with the touch-sensitive display, using the crown allows for the graphical output of the display to be visible (without being blocked by the finger that is providing the touch input).

Figure 8:
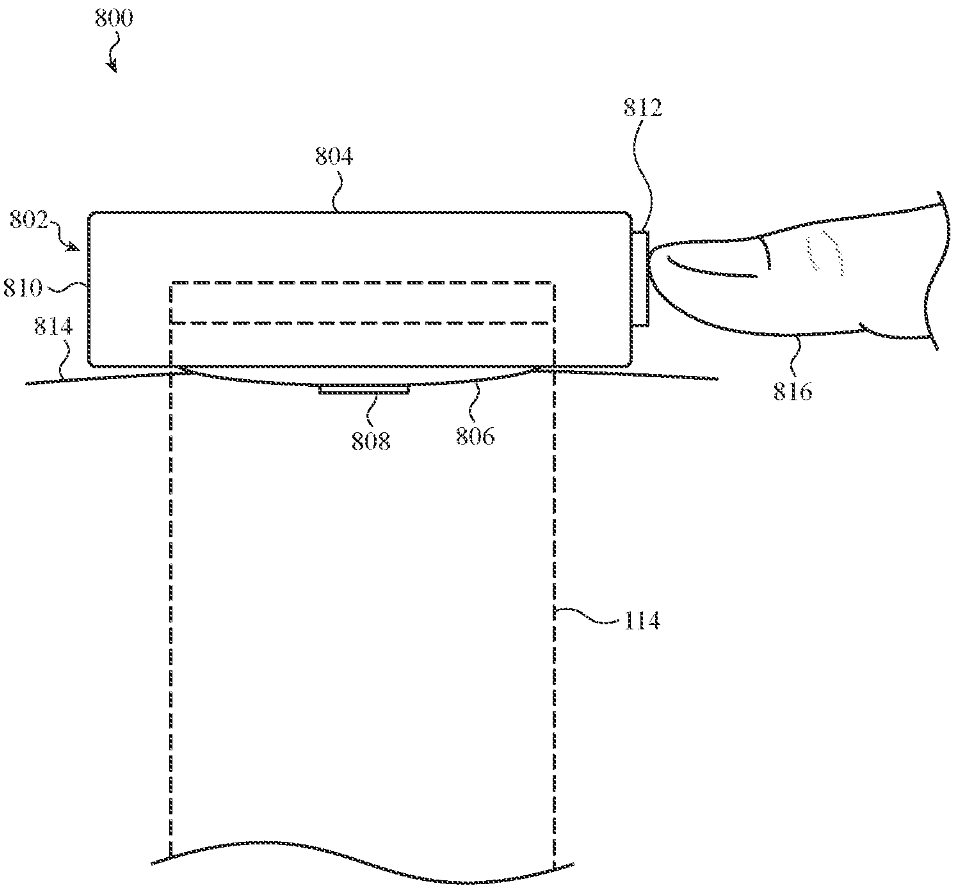
FIG. 8 shows an elevation of a watch body capable of sensing a biological parameter.

FIG. 8 shows an elevation of a watch body 800 capable of sensing a biological parameter. The watch body 800 may be an example of the watch body described with reference to FIG. 1B. The watch body 800 is defined by a housing 802, and the housing 802 may include a first cover sheet 804 that is part of or a display or display cover, a second cover sheet 806 having an exterior surface that supports one or more electrodes 808, one or more other housing members 810 defining sidewalls of the watch body 800, and a crown 812. The watch body 800 may be abutted to a user's wrist 814 or other body part, and may be adhered to the user by a watch band or other element (not shown). When abutted to a user's wrist 814, the electrode(s) 808 on the second cover sheet 806 may contact the user's skin. The user may touch the conductive cap (not shown) of the crown 812 with a finger 816. In some cases, the user may touch the crown 812 while also touching their wrist. However, high skin-to-skin impedance tends to reduce the likelihood that signals will travel from the electrodes 808, through their wrist 814 to their finger 816, and subsequently to the crown 812 (or vice versa). The intended signal path for acquiring an ECG is between one of the electrode(s) 808 on the second cover sheet 806 and the crown 812 via both of the user's arms and chest.

Figure 9:
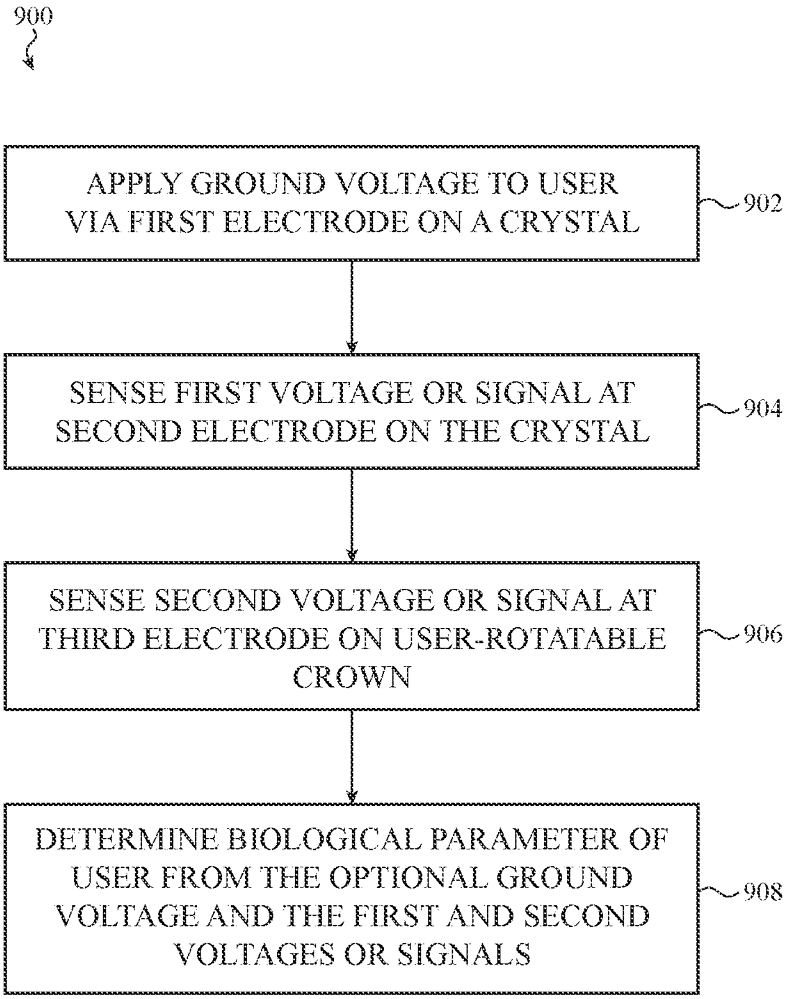
FIG. 9 shows an example method of determining a biological parameter of a user wearing a watch or other wearable electronic device.

FIG. 9 shows an example method 900 of determining a biological parameter of a user wearing an electronic watch or other wearable electronic device, such as a watch or wearable electronic device described herein.

At block 902, a ground voltage is optionally applied to a user via a first electrode on the electronic device. The first electrode may be on an exterior surface of a cover sheet that forms part of a housing of the electronic device. The operation(s) at 902 may be performed, for example, by the processing unit described with reference to FIG. 10, using one of the electrodes described with reference to FIGS. 1A-8.

At block 904, a first voltage or signal is sensed at a second electrode on the electronic device. The second electrode may also be on the exterior surface of the cover sheet. The operation(s) at 904 may be performed, for example, by the processing unit described with reference to FIG. 10, using one of the electrodes described with reference to FIGS. 1A-8.

At block 906, a second voltage or signal is sensed at a third electrode on the electronic device. The third electrode may be on a user-rotatable crown of the electronic device (e.g., the conductive cap 214 discussed above), on a button of the electronic device, or on another surface of the housing of the electronic device. In some embodiments, the ground voltage is applied, and the first voltage or signal is sensed on a wrist of one arm of the user, and the second voltage or signal is sensed on a fingertip of the user (with the fingertip belonging to a finger on a hand on the other arm of the user). The operation(s) at 906 may be performed, for example, by the processing unit described with reference to FIG. 10, using one of the electrodes described with reference to FIGS. 1A-8.

At block 908, the biological parameter of the user may be determined from the optional ground voltage, the first voltage or signal, and the second voltage or signal. The ground voltage may provide a reference for the first and second voltages or signals, or may otherwise be used to reject noise from the first and second voltages or signals. When the first and second voltages are obtained from different parts of the user's body, the biological parameter may be an electrocardiogram for the user. For example, the voltages may be used to generate an electrocardiogram for the user. The operation(s) at 908 may be performed, for example, by the processing unit described with reference to FIG. 10.

Figure 10:
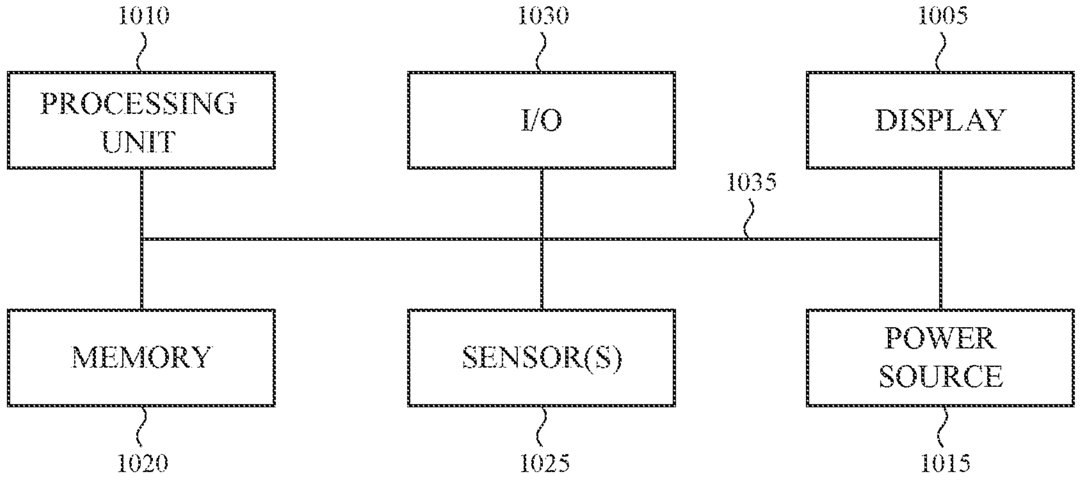
FIG. 10 shows a sample electrical block diagram of an electronic device such as a watch or other wearable electronic device.

FIG. 10 shows a sample electrical block diagram of an electronic device 1000, which electronic device may in some cases take the form of any of the electronic watches or other wearable electronic devices described with reference to FIGS. 1-9, or other portable or wearable electronic devices. The electronic device 1000 can include a display 1005 (e.g., a light-emitting display), a processing unit 1010, a power source 1015, a memory 1020 or storage device, a sensor 1025, and an input/output (I/O) mechanism 1030 (e.g., an input/output device, input/output port, or haptic input/output interface). The processing unit 1010 can control some or all of the operations of the electronic device 1000. The processing unit 1010 can communicate, either directly or indirectly, with some or all of the components of the electronic device 1000. For example, a system bus or other communication mechanism 1035 can provide communication between the processing unit 1010, the power source 1015, the memory 1020, the sensor 1025, and the input/output mechanism 1030.

The processing unit 1010 can be implemented as any electronic device capable of processing, receiving, or transmitting data or instructions. For example, the processing unit 1010 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., a sensor 1025) may be controlled by a first processing unit and other components of the electronic device 1000 (e.g., the display 1005) may be controlled by a second processing unit, where the first and second processing units may or may not be in communication with each other. In some cases, the processing unit 1010 may determine a biological parameter of a user of the electronic device, such as an ECG for the user.

The power source 1015 can be implemented with any device capable of providing energy to the electronic device 1000. For example, the power source 1015 may be one or more batteries or rechargeable batteries. Additionally or alternatively, the power source 1015 can be a power connector or power cord that connects the electronic device 1000 to another power source, such as a wall outlet.

The memory 1020 can store electronic data that can be used by the electronic device 1000. For example, the memory 1020 can store electrical data or content such as, for example, audio and video files, documents and applications, device settings and user preferences, timing signals, control signals, and data structures or databases. The memory 1020 can be configured as any type of memory. By way of example only, the memory 1020 can be implemented as random access memory, read-only memory, Flash memory, removable memory, other types of storage elements, or combinations of such devices.

The electronic device 1000 may also include one or more sensors 1025 positioned almost anywhere on the electronic device 1000. The sensor(s) 1025 can be configured to sense one or more type of parameters, such as but not limited to, pressure, light, touch, heat, movement, relative motion, biometric data (e.g., biological parameters), and so on. For example, the sensor(s) 1025 may include a heat sensor, a position sensor, a light or optical sensor, an accelerometer, a pressure transducer, a gyroscope, a magnetometer, a health monitoring sensor, and so on. Additionally, the one or more sensors 1025 can utilize any suitable sensing technology, including, but not limited to, capacitive, ultrasonic, resistive, optical, ultrasound, piezoelectric, and thermal sensing technology. In some examples, the sensors 1025 may include one or more of the electrodes described herein (e.g., one or more electrodes on an exterior surface of a cover sheet that forms part of a housing for the electronic device 1000 and/or an electrode on a crown, button, or other housing member of the electronic device).

The I/O mechanism 1030 can transmit and/or receive data from a user or another electronic device. An I/O device can include a display, a touch sensing input surface, one or more buttons (e.g., a graphical user interface "home" button), one or more cameras, one or more microphones or speakers, one or more ports such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic watch comprising:
a housing;
a crown assembly positioned along a side of the housing and configured to receive at least one of an axial input or a rotational input, the crown assembly comprising:
a shaft assembly;
a crown body coupled to the shaft assembly; and
a conductive cap coupled to the shaft assembly at an end of the shaft assembly and defining an electrode configured to receive an electrical signal from a user;
a sensing system configured to detect the at least one of the axial input or the rotational input; and
a processing unit configured to determine a biological parameter of a user based on the electrical signal received at the conductive cap.

2. The electronic watch of claim 1, wherein the sensing system comprises a force sensor configured to detect the axial input.

3. The electronic watch of claim 2, wherein the sensing system comprises a rotation sensor configured to detect the rotational input.

4. The electronic watch of claim 1, wherein the crown assembly further comprises
an intermediate component positioned between the crown body and the conductive cap and electrically isolating the crown body from the conductive cap.

5. The electronic watch of claim 1, wherein:
the conductive cap defines an axial end surface of the crown assembly; and
the electrode is defined by the axial end surface.

6. The electronic watch of claim 1, wherein:
the crown is configured to receive the axial input; and
the electronic watch further comprises a display coupled to the housing and configured to display a graphical output, the graphical output responsive to the axial input.

7. The electronic watch of claim 6, wherein the processing unit is configured to cause the graphical output to change based at least in part on a force magnitude of the axial input.

8. An electronic watch comprising:
a housing;
a transparent cover coupled to the housing and defining a front exterior surface of the electronic watch;
a display positioned below the transparent cover;
a crown assembly positioned along a side of the housing and comprising:
a crown body;
a shaft extending from the crown body and defining a mounting face; and
a conductive cap coupled to the mounting face and electrically isolated from the crown body, the conductive cap defining a first electrode configured to detect a first voltage;
a second electrode positioned at an exterior surface of the electronic watch and configured to detect a second voltage;
a sensing system configured to detect at least one of an axial input or a rotational input to the crown assembly; and
a processing unit within the housing and configured to generate an electrocardiogram using the first voltage and the second voltage.

9. The electronic watch of claim 8, wherein the sensing system comprises a force sensor configured to detect a magnitude of a force associated with the axial input.

10. The electronic watch of claim 9, wherein:
the display is configured to display a graphical output; and
the processing unit is configured to cause the graphical output to change based at least in part on the magnitude of the force associated with the axial input.

11. The electronic watch of claim 8, wherein the sensing system comprises an optical rotation sensing system configured to detect the rotational input based at least in part on light reflected from a rotating surface of the crown assembly.

12. The electronic watch of claim 8, wherein the crown assembly further comprises an electrical isolator between the conductive cap and the crown body.

13. The electronic watch of claim 12, wherein the processing unit is conductively coupled to the conductive cap via a conductive path extending through the shaft.

14. A wearable electronic device comprising:
a housing defining an opening;
a crown assembly configured to receive a rotational input and an axial input and comprising:
a crown body at least partially defining a recess;
a shaft mechanically coupled to the crown body and extending through the opening in the housing, the shaft defining a bottom surface of the recess; and
a conductive cap positioned at an end of the crown assembly and in the recess defined by the crown body, the conductive cap mechanically and electrically coupled to the shaft;

a display coupled to the housing and configured to display a graphical output, the graphical output responsive to the rotational input and the axial input; and a processing unit configured to generate an electrocardiogram of a user in response to detecting a voltage at the conductive cap.

15. The wearable electronic device of claim 14, further comprising:

a rotation sensor configured to detect the rotational input; and a force sensor configured to detect the axial input.

16. The wearable electronic device of claim 15, wherein the force sensor is configured to detect a magnitude of a force associated with the axial input.

17. The wearable electronic device of claim 15, wherein the force sensor is a dome switch.

18. The wearable electronic device of claim 14, wherein:

the crown assembly further comprises an isolating member positioned between the conductive cap and the crown body and configured to electrically isolate the conductive cap from the crown body;

the conductive cap defines a first portion of an axial end surface of the crown assembly; and the isolating member defines a second portion of the axial end surface of the crown assembly.

19. The wearable electronic device of claim 14, wherein the conductive cap is formed of a different material than the shaft.

20. The electronic watch of claim 1, wherein the conductive cap and the shaft assembly are formed of different materials.

* * * * *